(12) United States Patent
Abotabl et al.

(10) Patent No.: US 12,526,876 B2
(45) Date of Patent: Jan. 13, 2026

(54) SEMI-STATIC ADJUSTMENT OF CELL DTX/DRX ALIGNMENT FOR XR TRAFFIC

(71) Applicant: QUALCOMM Incorporated, San Diego, CA (US)

(72) Inventors: Ahmed Attia Abotabl, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/301,195

(22) Filed: Apr. 14, 2023

(65) Prior Publication Data

US 2024/0349390 A1    Oct. 17, 2024

(51) Int. Cl.
*H04W 76/28* (2018.01)
*H04W 72/11* (2023.01)

(52) U.S. Cl.
CPC ............ *H04W 76/28* (2018.02); *H04W 72/11* (2023.01)

(58) Field of Classification Search
CPC ..... H04W 76/28; H04W 72/11; H04W 28/02; H04W 36/0061; H04W 52/02; H04W 52/0203; H04W 52/0206; Y02D 30/70
See application file for complete search history.

(56) References Cited

U.S. PATENT DOCUMENTS

2023/0051778 A1    2/2023  Lee et al.
2024/0107444 A1*   3/2024  Hu ........................ H04W 76/28
2024/0267987 A1*   8/2024  Babaei .................. H04W 76/28
2024/0284550 A1*   8/2024  Tseng ................. H04W 72/1273
2025/0126553 A1*   4/2025  Fu ...................... H04W 52/0206
2025/0151155 A1*   5/2025  Mazloum ............. H04W 76/28

FOREIGN PATENT DOCUMENTS

WO    2020247744 A1    12/2020
WO    2023019074 A1     2/2023

OTHER PUBLICATIONS

WO_2023/160898_A1 (Year: 2023).*
WO_2024/026911_A1 (Year: 2024).*
International Search Report and Written Opinion—PCT/US2024/019969—ISA/EPO—Jul. 9, 2024.

* cited by examiner

*Primary Examiner* — Rushil P. Sampat
(74) *Attorney, Agent, or Firm* — ArentFox Schiff, LLP

(57) ABSTRACT

This disclosure provides methods, components, devices and systems for configuration of non-uniform or non-integer cell DRX or DTX cycles. Some aspects specifically relate to configuration of non-uniform or non-integer cell DRX or DTX cycles to align with communicated data such as XR content having a non-integer periodicity. In some examples, a UE receives from a network entity one or more configurations indicating a non-uniform or non-integer timing pattern associated with a cell DRX or DTX cycle. For example, a configuration may indicate a set of different integer periodicities, rational cycle periodicities, start times, or adjustment values to align the on durations of respective cycles with traffic occasions associated with non-integer periodicities. The UE may alternatively receive multiple configurations to this effect. Consequently, XR content or other data may respectively be communicated to or from the network entity in the traffic occasions during the on durations of these cycles.

17 Claims, 11 Drawing Sheets

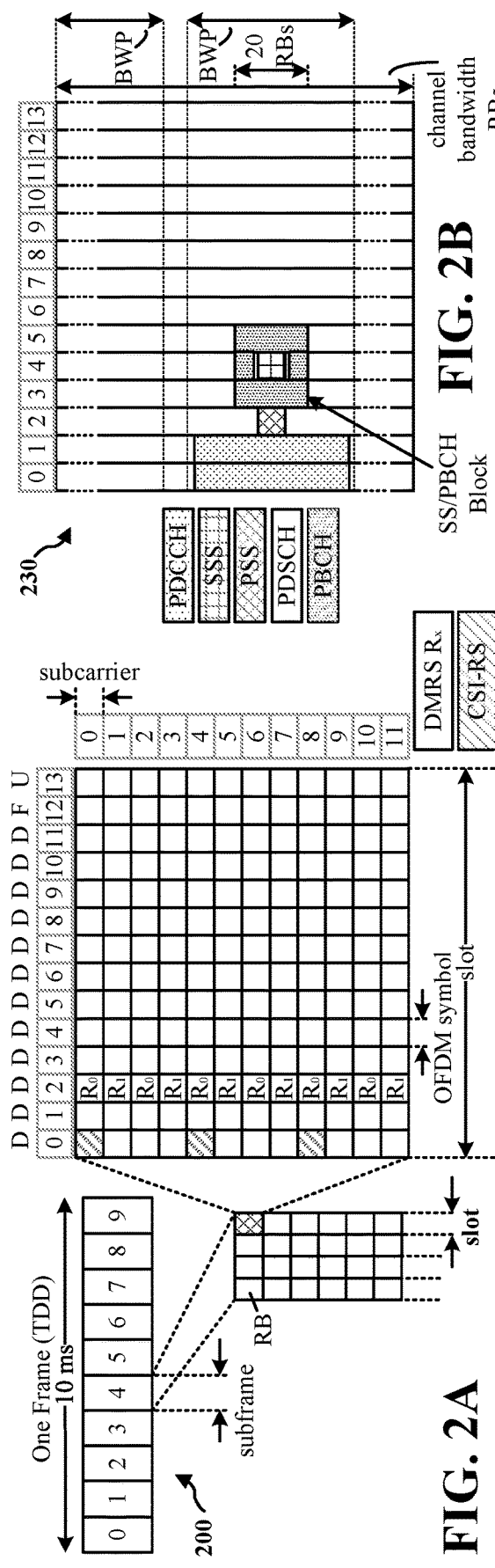
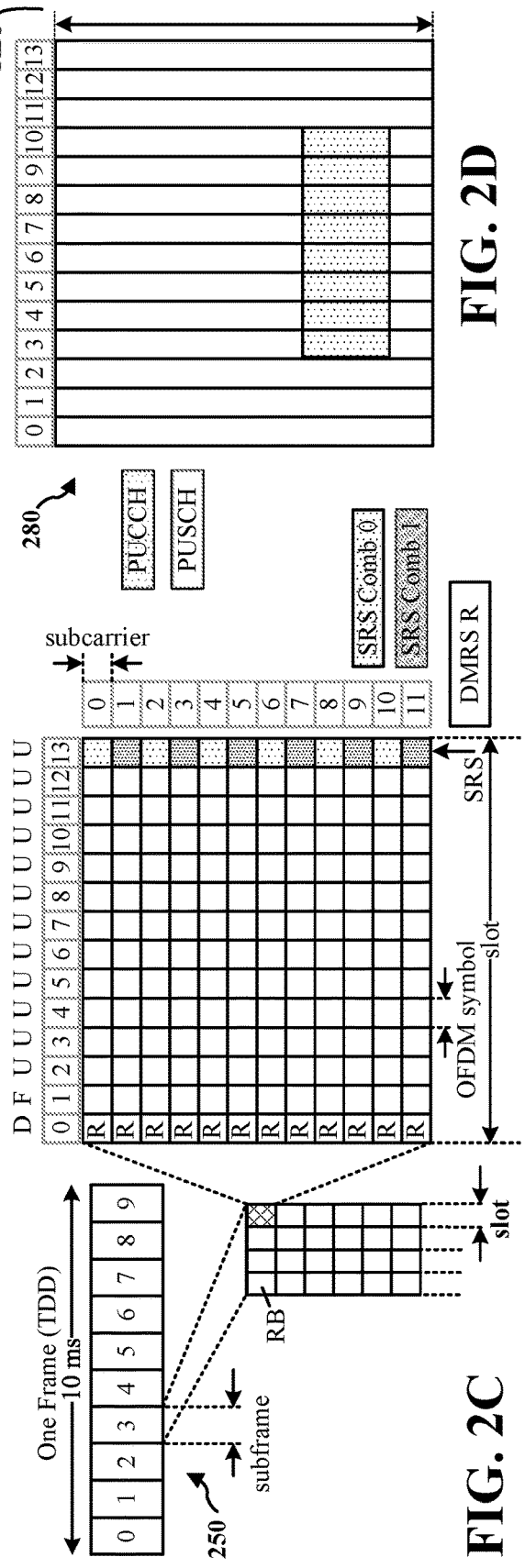
FIG. 2A
FIG. 2B
FIG. 2C
FIG. 2D

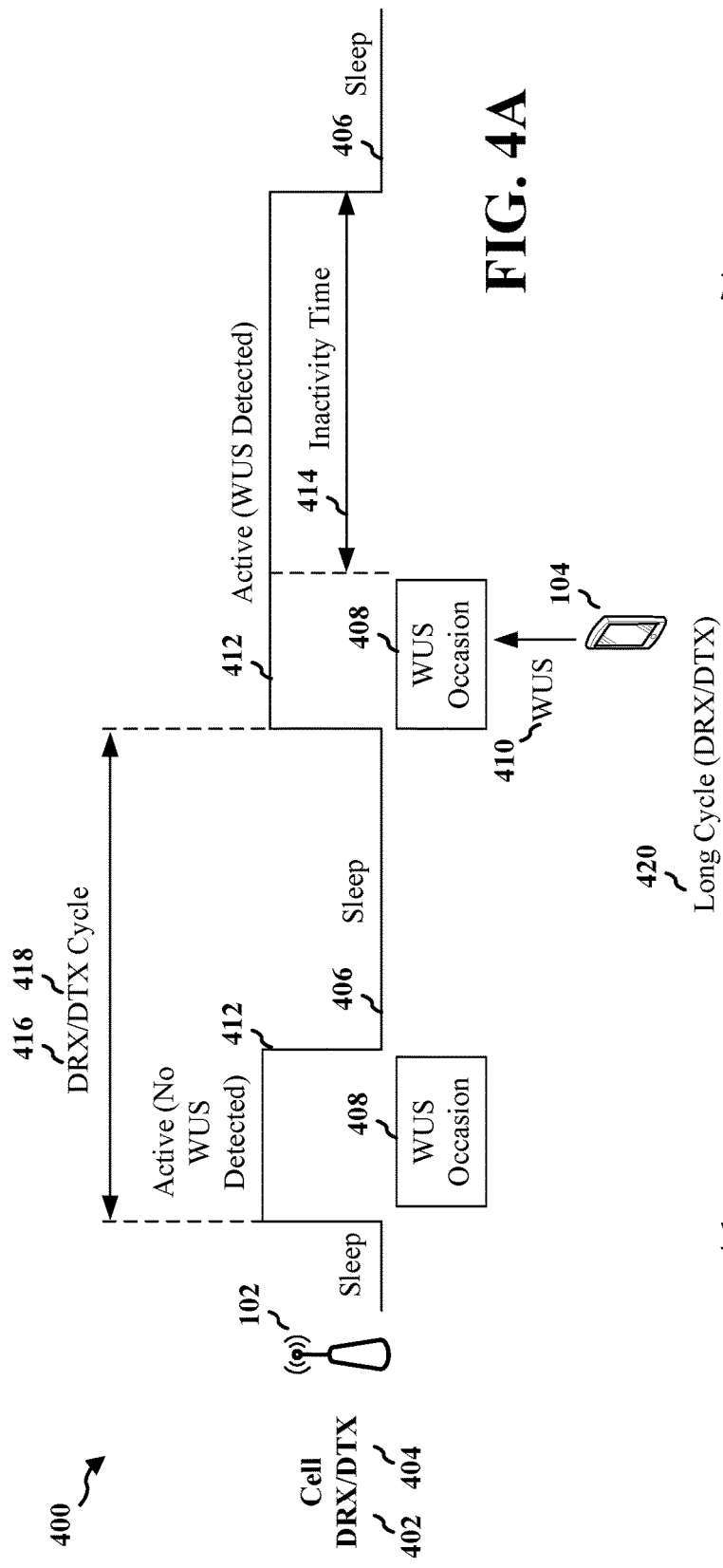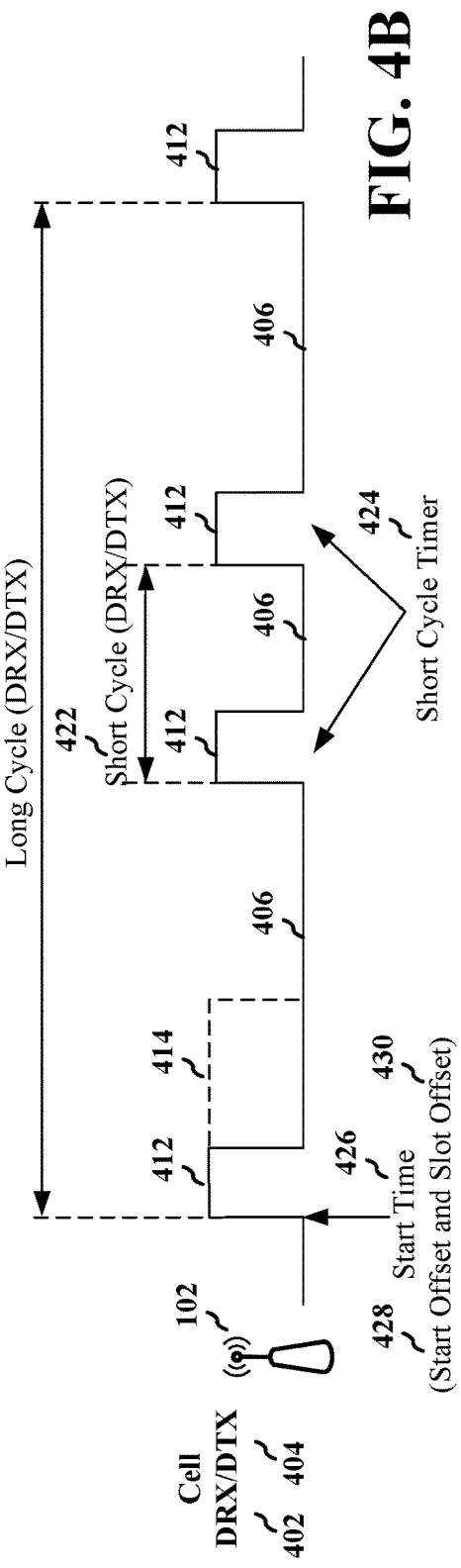

SEMI-STATIC ADJUSTMENT OF CELL DTX/DRX ALIGNMENT FOR XR TRAFFIC

TECHNICAL FIELD

The present disclosure generally relates to wireless communication, and more particularly, to a wireless communication system providing cell discontinuous reception (DRX) or cell discontinuous transmission (DTX).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication performable at a user equipment (UE). The method includes receiving, from a network entity, a configuration for discontinuous reception (DRX) or discontinuous transmission (DTX) of the network entity, the configuration indicating a non-uniform timing pattern or a non-integer timing pattern associated with a DRX cycle or a DTX cycle of the network entity. The method further includes transmitting to or receiving data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion.

Another innovative aspect of the subject matter described in this disclosure can be implemented in an apparatus for wireless communication, such as a UE. The apparatus includes a memory, and a processor communicatively coupled with the memory. The processor is operable to cause the apparatus to receive, from a network entity, a configuration for DRX or DTX of the network entity, the configuration indicating a non-uniform timing pattern or a non-integer timing pattern associated with a DRX cycle or a DTX cycle of the network entity. The processor is further operable to cause the apparatus to transmit to or receive data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion.

In some examples of the methods and apparatuses, the DRX cycle or the DTX cycle is associated with the non-uniform timing pattern, the configuration indicates a plurality of first cycle periodicities, and one of the first cycle periodicities is different than another one of the first cycle periodicities.

In some examples of the methods and apparatuses, the DRX cycle or the DTX cycle is associated with the non-uniform timing pattern, the configuration indicates a uniform cycle periodicity and a plurality of start times associated with the uniform cycle periodicity, and a periodicity corresponding to one of the start times is different than a periodicity corresponding to another one of the start times.

In some examples of the methods and apparatuses, the DRX cycle or the DTX cycle is associated with the non-uniform timing pattern, the configuration indicates a uniform cycle periodicity, a start time associated with the uniform cycle periodicity, an adjustment value, and a quantity of cycles, and the start time is adjusted with the adjustment value after an occurrence of the quantity of cycles.

In some examples of the methods and apparatuses, the DRX cycle or the DTX cycle is associated with the non-uniform timing pattern, the processor is further operable to cause the apparatus to receive a second configuration for the DRX or the DTX of the network entity, the configuration indicates a first uniform cycle periodicity and the second configuration indicates a second uniform cycle periodicity, and the first uniform cycle periodicity is different than the second uniform cycle periodicity.

In some examples of the methods and apparatuses, the DRX cycle or the DTX cycle is associated with the non-integer timing pattern, the configuration indicates a uniform rational cycle periodicity, and a start time for the DRX cycle or the DTX cycle is a floored function of the uniform rational cycle periodicity.

Another innovative aspect of the subject matter described in this disclosure can be implemented in a method for wireless communication performable at a network entity. The method includes transmitting, to a UE, a configuration for DRX or DTX of the network entity, the configuration indicating a non-uniform timing pattern or a non-integer timing pattern associated with a DRX cycle or a DTX cycle of the network entity. The method further includes receiving from or transmitting data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion.

Another innovative aspect of the subject matter described in this disclosure can be implemented in an apparatus for wireless communication, such as a network entity. The apparatus includes a memory and a processor communicatively coupled with the memory. The processor is operable to cause the apparatus to transmit, to a UE, a configuration for DRX or DTX of the apparatus, the configuration indicating a non-uniform timing pattern or a non-integer timing pattern associated with a DRX cycle or a DTX cycle of the apparatus, the apparatus being a network entity. The processor is further operable to cause the apparatus to receive from or transmit a signal to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion.

In some examples of the methods and apparatuses, the DRX cycle or the DTX cycle is associated with the non-uniform timing pattern, the configuration indicates a plurality of first cycle periodicities, and one of the first cycle periodicities is different than another one of the first cycle periodicities.

In some examples of the methods and apparatuses, the DRX cycle or the DTX cycle is associated with the non-uniform timing pattern, the configuration indicates a uniform cycle periodicity and a plurality of start times associated with the uniform cycle periodicity, and a periodicity corresponding to one of the start times is different than a periodicity corresponding to another one of the start times.

In some examples of the methods and apparatuses, the DRX cycle or the DTX cycle is associated with the non-uniform timing pattern, the configuration indicates a uniform cycle periodicity, a start time associated with the uniform cycle periodicity, an adjustment value, and a quantity of cycles, and the start time is adjusted with the adjustment value after an occurrence of the quantity of cycles.

In some examples of the methods and apparatuses, the DRX cycle or the DTX cycle is associated with the non-uniform timing pattern, the processor is further operable to cause the apparatus to transmit a second configuration for the DRX or the DTX of the network entity, the configuration indicates a first uniform cycle periodicity and the second configuration indicates a second uniform cycle periodicity, and the first uniform cycle periodicity is different than the second uniform cycle periodicity.

In some examples of the methods and apparatuses, the DRX cycle or the DTX cycle is associated with the non-integer timing pattern, the configuration indicates a uniform rational cycle periodicity, and a start time for the DRX cycle or the DTX cycle is a floored function of the uniform rational cycle periodicity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first subframe within a 5G NR frame structure.

FIG. 2B is a diagram illustrating an example of DL channels within a 5G NR subframe.

FIG. 2C is a diagram illustrating an example of a second subframe within a 5G NR frame structure.

FIG. 2D is a diagram illustrating an example of UL channels within a 5G NR subframe.

FIGS. 4A and 4B are diagrams illustrating an example of cell discontinuous reception (DRX) or cell discontinuous transmission (DTX).

DETAILED DESCRIPTION

Figure 1A:
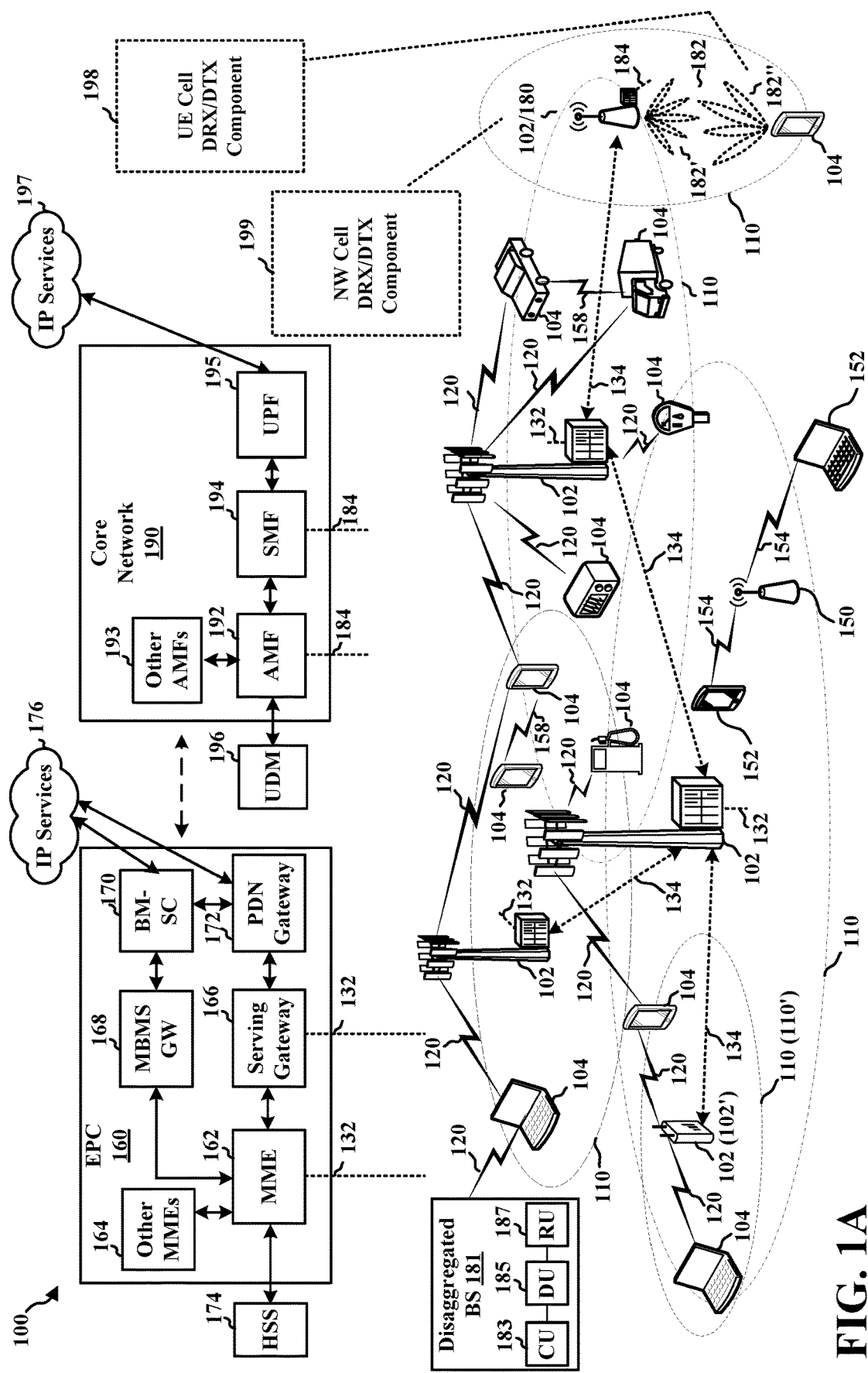
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects generally relate to cell discontinuous reception (DRX) or cell discontinuous transmission (DTX). More particularly, aspects specifically relate to configuration of non-uniform or non-integer cell DRX or DTX cycles. In a first example, a network entity such as a base station may configure a user equipment (UE) with a non-uniform timing pattern for cell DRX or cell DTX, such as a set of different periodicities corresponding to respective DRX or DTX cycles. In response to the configuration, the UE and network entity may semi-statically switch between the different cell DRX or DTX cycles. In a second example, the network entity may configure the UE with a non-integer timing pattern for cell DRX or cell DTX, such as a cycle periodicity having a rational value which is uniformly applied to configured DRX or DTX cycles. The UE and network entity may also apply a floor operation to round down the non-integer periodicity value when calculating a start time for an on duration of a given cell DRX or DTX cycle. In a third example, the network entity may configure the UE with a non-uniform timing pattern for cell DRX or cell DTX via different start offset or slot offset values respectively corresponding to multiple on durations within a same DRX or DTX cycle. In a fourth example, the network entity may configure the UE with a non-uniform timing pattern for cell DRX or cell DTX via an adjusted offset value which is applied to an on duration start time of a respective DRX or DTX cycle after a configured quantity of DRX or DTX cycles. In a fifth example, the network entity may configure the UE with a non-uniform timing pattern for cell DRX or DTX via multiple cell DRX or DTX configurations.

Particular aspects of the subject matter described in this disclosure can be implemented to realize one or more of the following potential advantages. Through configuration of non-uniform or non-integer cell DRX or DTX cycles, the network entity may prevent or minimize the risk of on durations in cell DRX or cell DTX having misalignment with extended reality (XR) traffic bursts or other bursts of traffic having non-integer periodicities (such as 8.333 ms). The aforementioned configuration examples also allow non-uniform and non-integer cycle timing patterns to be achieved without significant changes to cell DRX or DTX parameters, configurations, or rules. In the first example, sets of different periodicities corresponding to respective DRX or DTX cycles may be configured using selected values for long and short cycle periodicities to achieve non-uniform cycle timing patterns through minimal addition of information elements. In the second example, rational (non-integer) values for long or short cycle periodicities may be applied in formulas for computing on duration start times with minimal changes to such formulas to implement non-integer cycle timing patterns, namely using floor operations or other rounding functions. In the third example, multiple start offsets or slot offsets may be configured within a single DRX or DTX cycle to effectively provide a non-uniform cycle timing pattern with minimal implementation cost. In the fourth example, an adjustment value may be configured to periodically adjust an on duration start time after a configured quantity of cycles to achieve non-uniform cycle timing patterns with minimal changes to cell DRX or DTX configurations. In the fifth example, multiple cell DRX or DTX configurations may be provided with different uniform periodicities for respective DRX or DTX cycles, thereby allowing the base station to configure non-uniform cycle timing patterns without adding new information elements to cell DRX or DTX configurations to support such patterns. In any of these examples, UEs may transmit or receive XR data or other data with non-integer periodicities without additional delays caused from on duration misalignment, thereby allowing network energy savings associated with cell DRX or DTX to be achieved with minimal impact on downlink or uplink latency.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (cNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
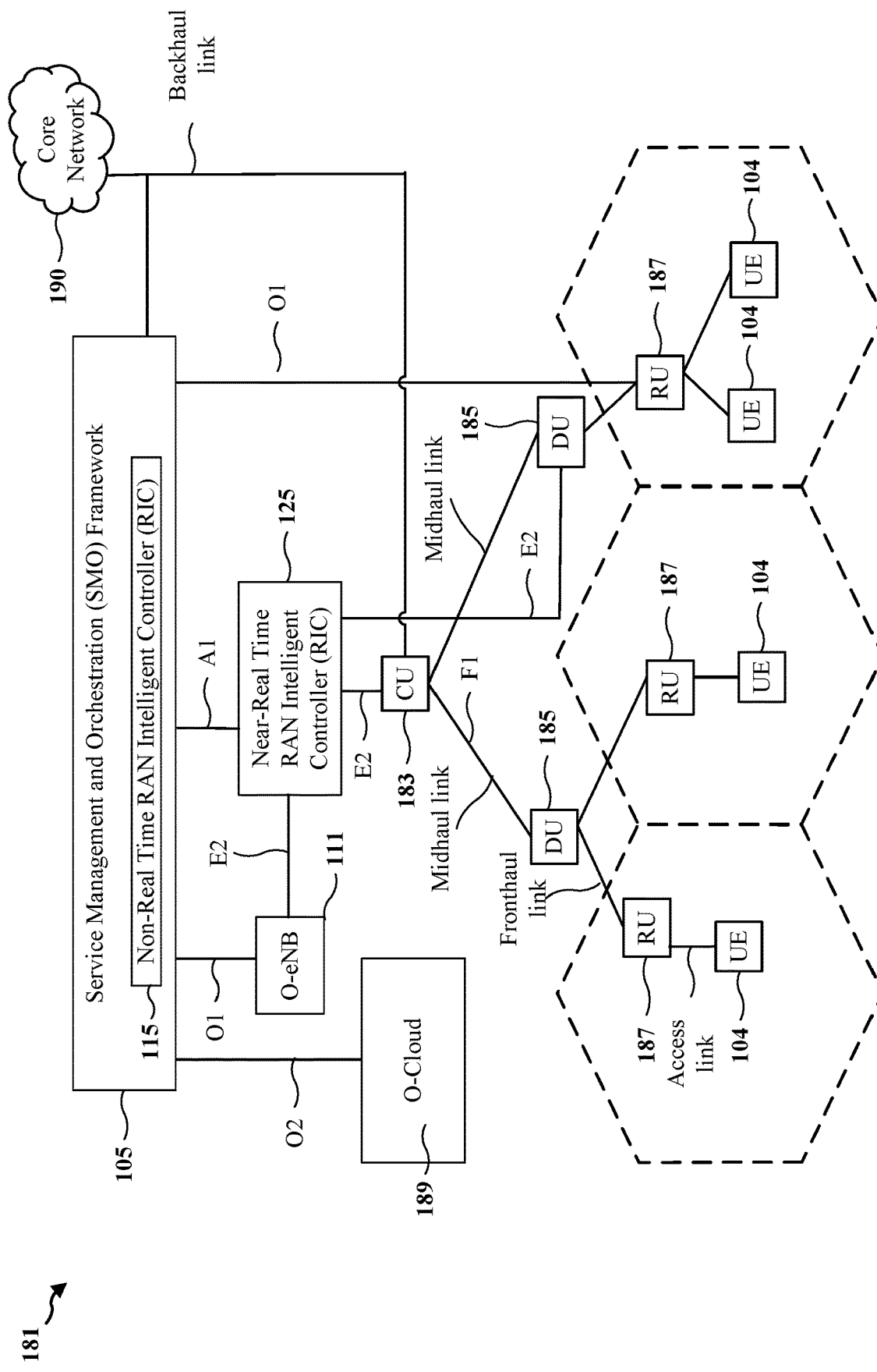
FIG. 1B shows a diagram illustrating an example disaggregated base station architecture.

FIG. 1B shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUS 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

Referring again to FIG. 1A, in certain aspects, the UE 104 may include a UE cell DRX or DTX component 198 that is configured to receive, from a network entity such as base station 102/180, a configuration for DRX or DTX of the network entity, the configuration indicating a non-uniform timing pattern or a non-integer timing pattern associated with a DRX cycle or a DTX cycle of the network entity. The UE cell DRX or DTX component 198 is further configured to transmit to or receive data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion.

In certain aspects, the base station 102/180 (or other network entity with base station functionality) may include a network (NW) cell DRX or DTX component 199 that is configured to transmit, to a UE, a configuration for DRX or DTX of the network entity, the configuration indicating a non-uniform timing pattern or a non-integer timing pattern associated with a DRX cycle or a DTX cycle of the network entity. The NW cell DRX or DTX component 199 is further configured to receive from or transmit data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu *15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data and may additionally be used to carry a buffer status report (BSR), a power headroom report (PHR), and/or UCI.

Figure 3:
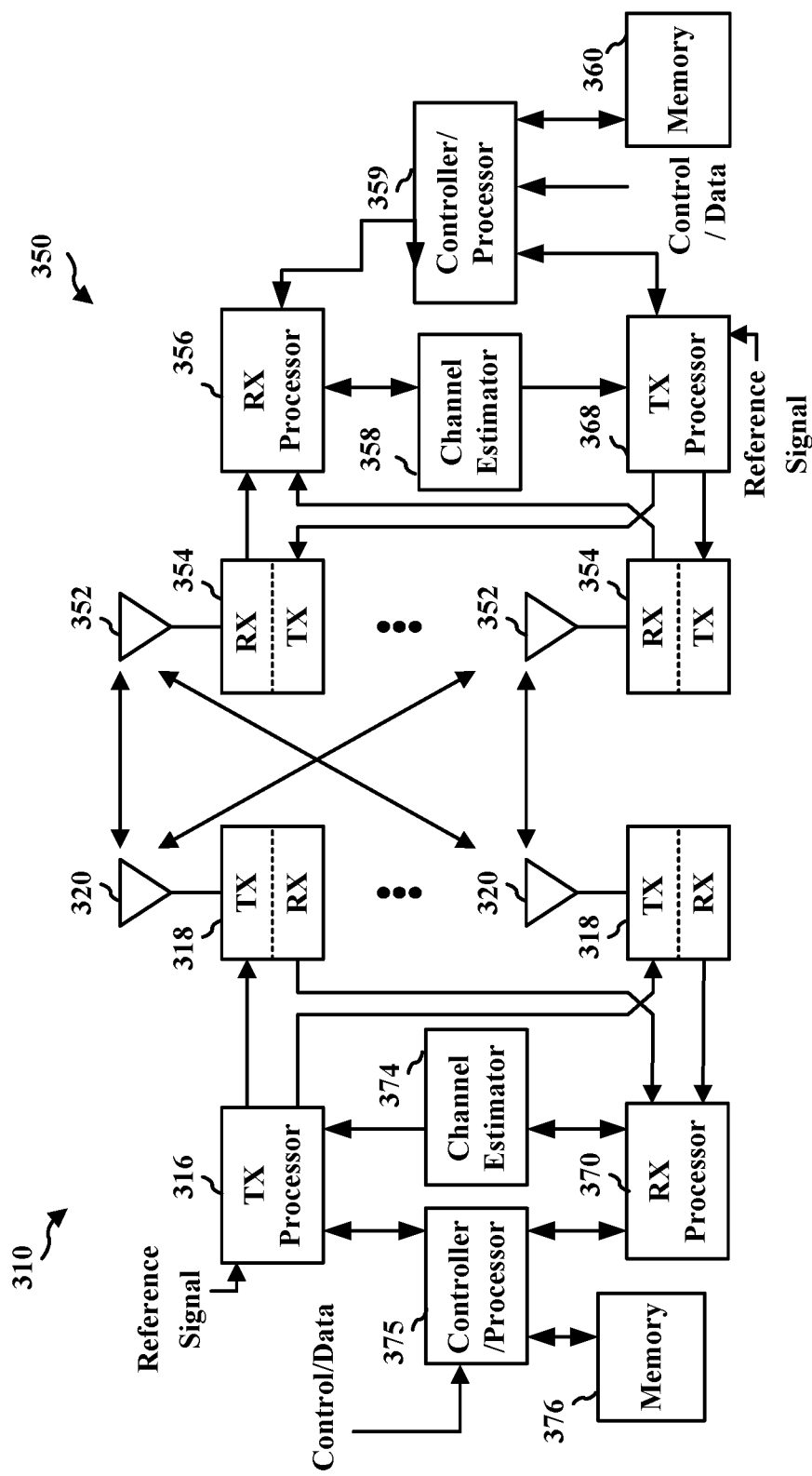
FIG. 3 is a block diagram of a base station (BS) in communication with a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical 1 channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE cell DRX or DTX component 198 of FIG. 1A.

At least one of the TX processor 316, the RX processor 370, and the controller/processor 375 may be configured to perform aspects in connection with NW cell DRX or DTX component 199 of FIG. 1A.

Network energy efficiency is a key trend towards which network operators are moving given the high energy costs of radio access usage. As base stations 102/180 or radio access networks (RANs) generally incur significant energy costs to run a cellular network, studies on green networks have been conducted to evaluate network energy consumption and associated key performance indicators. These studies have produced a motivation to improve network energy savings in terms of base station transmission and reception in the time domain, frequency domain, spatial domain, or power domain, with potential support or feedback from the UE 104.

FIGS. 4A and 4B illustrate an example 400 of an approach that may be applied to achieve network energy savings, namely cell discontinuous reception (DRX) or cell discontinuous transmission (DTX). Referring to FIG. 4A, the mechanics of cell DRX 402 or cell DTX 404, or DRX or DTX performed at base station 102, may be similar to the mechanics of UE DRX or UE DTX, or DRX or DTX performed at UE 104. For example, during cell DRX 402 or cell DTX 404, the base station 102 periodically operates in a sleep mode to save power when no UE transmissions or base station transmissions respectively are expected during this time. The time when the base station operates in the sleep mode or stops supplying power to its radio frequency (RF) chains or RF components such as its antennas, transmitter(s), receiver(s), or transceiver(s), is referred to as an off duration 406 in cell DRX 402 or cell DTX 404. The base station 102 is considered to be inactive during the off duration 406. At periodic time occasions 408, the base station 102 monitors for an uplink transmission 410, for example a wake-up signal (WUS) from the UE 104, which transmission indicates to the base station 102 that a subsequent uplink transmission from that UE 104 or a downlink transmission to that UE 104 is to be expected. These occasions 408 during which the base station 102 wakes up or applies power to its RF chains or RF components such as its antennas, transmitter(s), receiver(s), or transceiver(s), is referred to as an on duration 412 in cell DRX 402 or cell DTX 404. The base station 102 is considered to be active during the on duration 412. If the base station 102 fails to detect or receive the WUS or other uplink transmission 410 from the UE 104 while the base station 102 is active during the on duration 412, the base station 102 again becomes inactive for the off duration 406 to save power until the next, on duration 412. If the base station 102 detects or receives the WUS or other uplink transmission 410 from the UE 104 during the on duration 412, the base station 102 remains active, or continues to apply power to its RF chains or RF components, for a period of time during which the base station expects the subsequent uplink transmission or downlink transmission to occur. This period of time is referred to as an inactivity time 414 in cell DRX 402 or cell DTX 404. After this period of time has passed, the base station 102 again becomes inactive for the off duration 406 to save power until a next, on duration 412.

To configure cell DRX 402 or cell DTX 404, the base station 102 may apply a similar configuration approach as for UE DRX or UE DTX. For example, before performing cell DRX 402 or cell DTX 404, the base station 102 may configure the UE 104 with various parameters similar to those configured for UE DRX or UE DTX, including, but not limited to, a periodicity and start offset for a long DRX cycle (using a parameter drx-LongCycleStartOffset or similar parameter name), a periodicity for a short DRX cycle (using the parameter drx-ShortCycle or similar parameter name), a short DRX cycle timer (using the parameter drx-ShortCycleTimer or similar parameter name), and a slot offset (using the parameter drx-SlotOffset or similar parameter name). Here, a cell DRX cycle 416 or cell DTX cycle 418 includes the on duration 412 of the base station 102 and the off duration 406 of the base station 102. Thus, the total time during which the base station is active and inactive, before the base station becomes active again, corresponds to one DRX cycle 416 or DTX cycle 418.

Referring now to FIG. 4B, the DRX cycle 416 or DTX cycle 418 may be a long cycle 420 or a short cycle 422. Long cycle 420 is a cycle which includes on duration 412 and off duration 406 that repeats periodically. Short cycle 422 is a cycle which periodicity is shorter than long cycle 420 and which is triggered if data activity is detected during the on duration 412 of the long cycle 420. A short cycle timer 424 indicates the number of short cycles 422 which are to occur before the long cycle 420 starts again. A start time 426 of the on duration 412 of the long cycle 420 or short cycle 422 may be represented by a start offset 428, which indicates the subframe when the DRX/DTX cycle starts, and a slot offset 430, which indicates the time from the beginning of the subframe when the on duration 412 starts.

Figure 5:
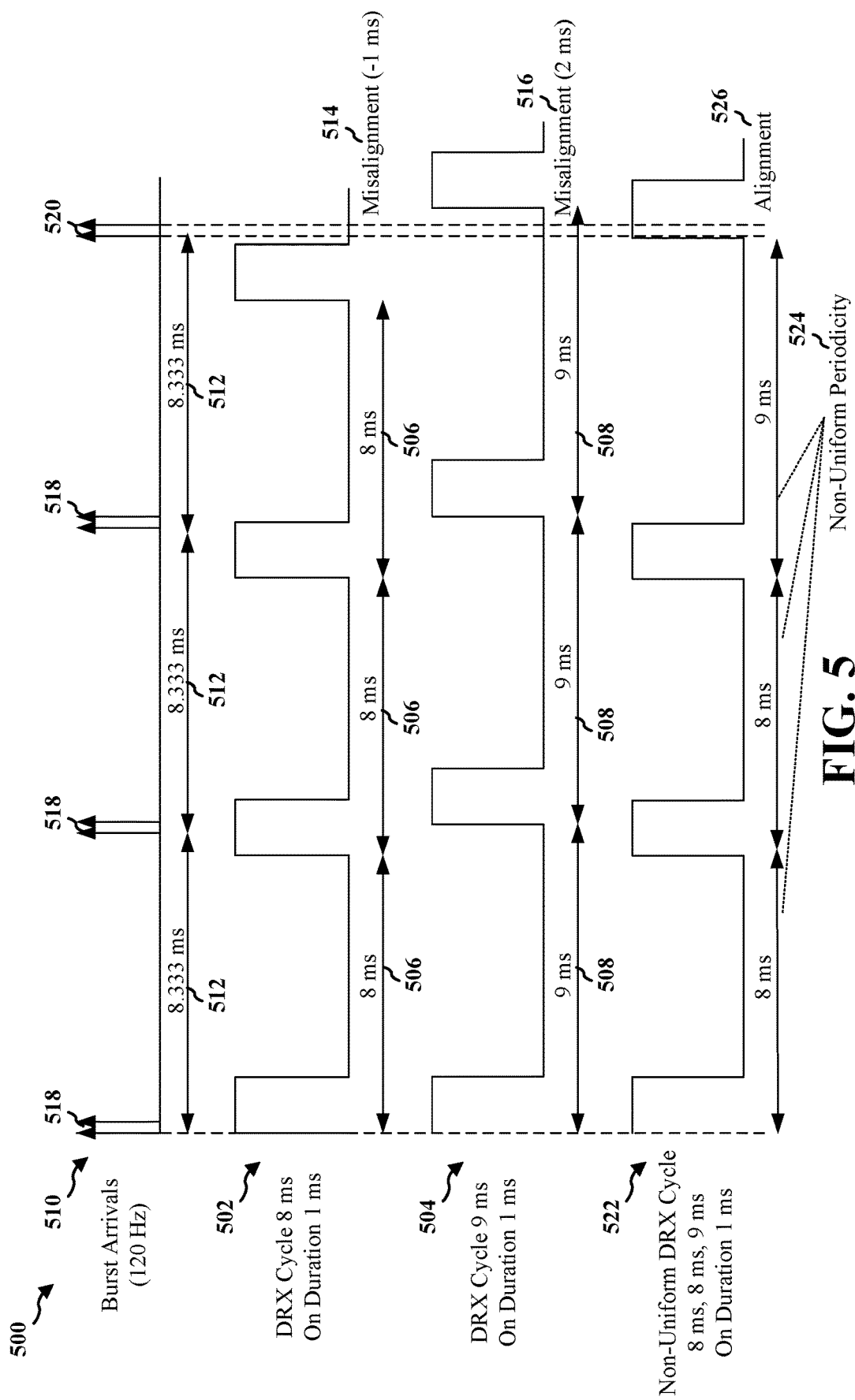
FIG. 5 is a diagram illustrating examples of UE DRX cycles.

FIG. 5 is a diagram 500 illustrating examples 502, 504 of UE DRX cycles. While the illustrated examples are described in connection with UE DRX, these examples may similarly apply to UE DTX. Currently, when the base station 102 configures UE DRX or UE DTX, the periodicity of the DRX cycle is uniform and integer. For example, a periodicity 506 of a DRX cycle in example 502 may be configured to be 8 ms as illustrated, a periodicity 508 of a DRX cycle in example 504 may be configured to be 9 ms as illustrated, or some other integer periodicity that remains uniform over multiple DRX cycles may be configured. However, if the UE 104 is to receive or transmit data during an on duration of a DRX cycle or DTX cycle according to an example traffic pattern 510 having a non-integer periodicity 512, then the uniform, integer periodicity of the DRX or DTX cycle may result in misalignment 514, 516 with the data traffic periodicity. For example, bursts of traffic including extended reality (XR) content tend to include frequency units such as 60 Hz, 90 Hz, 45 Hz, 120 Hz. 48 Hz, etc., which respectively correspond to arrival periodicities of 16.666 ms, 11.111 ms, 22.222 ms, 8.333 ms, 20.833 ms, etc. Thus, if XR data or other periodic bursts of traffic are delivered to the UE 104 in traffic occasions 518, 520 at intervals of 8.333 ms such as illustrated in the example of FIG. 5, but the UE DRX cycle periodicity is configured to be 8 ms such as illustrated in example 502 of FIG. 5, then the timing of the DRX on duration may drift by −1 ms with respect to traffic occasion 520 after three DRX cycles or frames to no longer align with the XR traffic periodicity. This latency may continue creeping up every subsequent three DRX cycles or frames, with an average latency resulting of approximately one half of the duty cycle duration. Similarly, if the UE DRX cycle periodicity is configured to be 9 ms such as illustrated in example 504 of FIG. 5, then the timing of the DRX on duration may drift by 2 ms with respect to traffic occasion 520 after three DRX cycles or frames to no longer align with the XR traffic periodicity. In either example, the UE 104 may end up not being active when the XR content or other data is expected to be received, and consequently the UE 104 may fail to receive the data.

A similar misalignment situation may arise in cell DRX 402 or cell DTX 404, if cell DRX cycles 416 or cell DTX cycles 418 are configured in a similar manner as in UE DRX or UE DTX. For example, if cell DRX or DTX configurations merely include uniform and integer periodicities for long cycles 420 or short cycles 422, such as periodicities 506, 508, then the base station 102 may fail to receive or transmit XR data or other data having non-integer periodicity 512 due to the resulting misalignment 514, 516 or drift in on duration timing with respect to traffic occasion 520. Thus, it would be helpful to enhance cell DRX or DTX configurations to support XR traffic or other content with non-integer periodicities 512.

One approach to prevent on duration misalignment with non-integer traffic periodicities, such as associated with XR content, is to provide non-uniform or non-integer DRX or DTX cycles. An example of non-uniform DRX cycles in connection with UE DRX is illustrated in example 522 of FIG. 5. For instance, if XR content includes an arrival periodicity of 8.333 ms, such as illustrated in the example traffic pattern 510 of FIG. 5, then the UE 104 may apply a non-uniform periodicity 524 across three DRX cycles or frames spanning 8 ms, 8 ms, and 9 ms respectively, or an [8, 8, 9] ms pattern of three DRX cycle periodicities, to maintain alignment 526 with the traffic occasion 520 of the XR traffic timing after a 25 ms interval. Similarly, in cell DRX 402 or cell DTX 404, the base station 102 may configure and apply non-uniform periodicity 524 for its cycles, such as an [8, 8, 9] ms pattern of three DRX cycle periodicities, to prevent drifts of on duration timings with respect to XR traffic or other data with non-integer periodicities 512. Alternatively, rather than configuring and applying non-uniform periodicity 524 for its cell DRX or cell DTX cycles, the base station 102 may configure and apply the non-integer periodicity 512 for its cell DRX or cell DTX cycles, such to uniformly span 8.333 ms, so that alignment 526 may similarly be achieved with XR or similar data traffic. To these ends, various examples are provided as to how the base station 102 may configure non-uniform or non-integer cell DRX or cell DTX cycles, so that the base station 102 may successfully align its cell DRX or cell DTX cycles with XR data bursts or other traffic having non-uniform traffic periodicities. As a result, network energy savings may be achieved with minimal impact on downlink or uplink latency.

Figure 6:
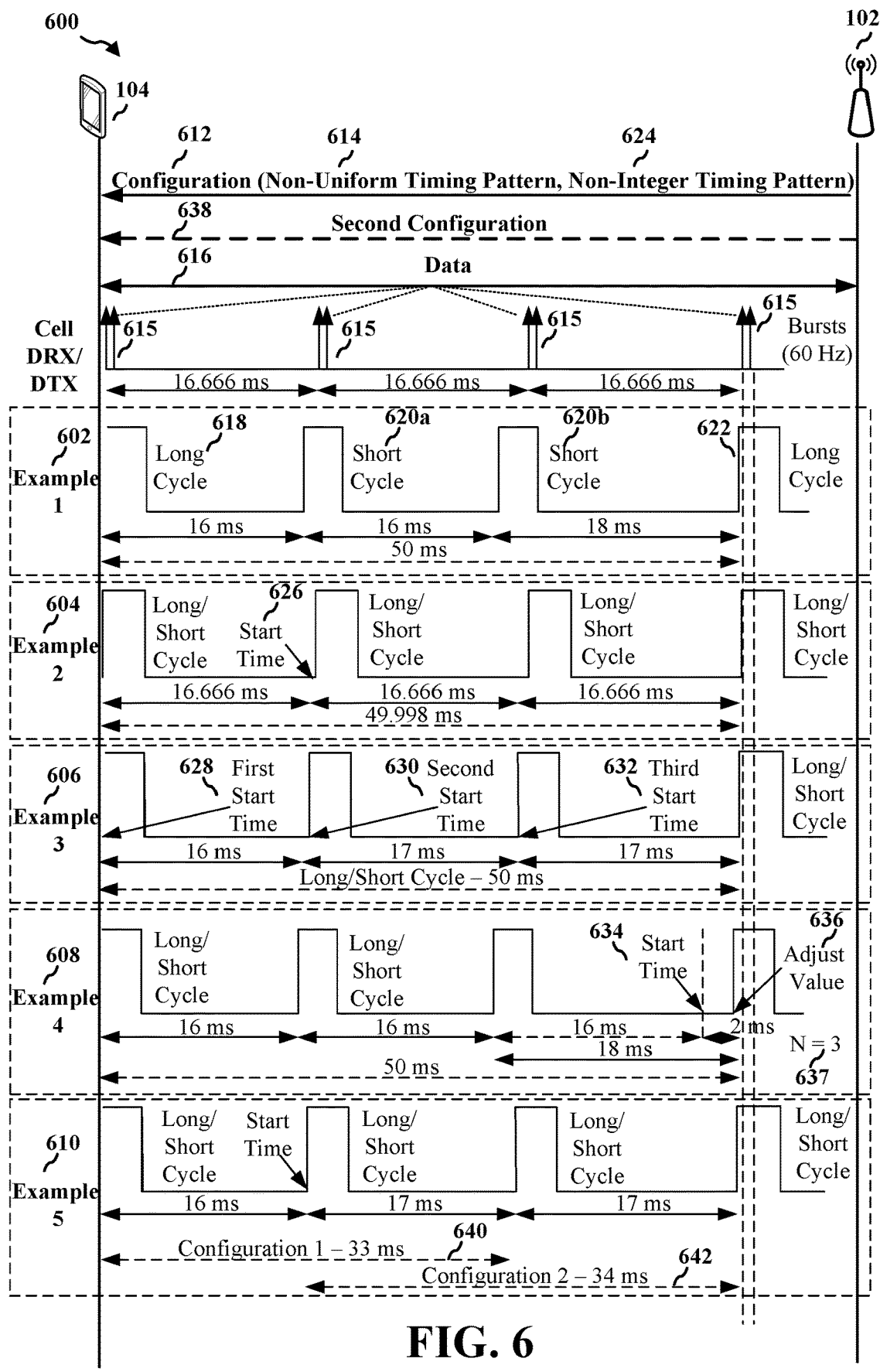
FIG. 6 is a diagram illustrating an example of a call flow between a UE and a BS illustrating various examples of how the BS may configure non-uniform or non-integer cell DRX or cell DTX cycles.

FIG. 6 is a call flow diagram 600 illustrating various examples 602, 604, 606, 608, 610 of how base station 102 may configure non-uniform or non-integer cell DRX or cell DTX cycles for UE 104 in one or more DRX or DTX configurations. The non-uniform or non-integer cell DRX or DTX cycles may be configured according to any one of these examples or any multiple ones of these examples. For example, the UE 104 or base station 102 may apply one or more of these examples, in combination, when indicating a non-uniform timing pattern or non-integer timing pattern in a cell DRX or DTX configuration. Similarly, each of the one or more DRX or DTX configurations may be configured to indicate a non-uniform timing pattern, a non-integer timing pattern, both non-uniform and non-integer timing patterns in a same configuration, a non-uniform timing pattern in one configuration and a non-integer timing pattern in another configuration, or other configuration examples.

In the first example 602, the base station 102 may provide a configuration 612 to the UE 104 which indicates a non-uniform timing pattern 614, such as a non-uniform, integer periodicity associated with multiple cycles, for cell DRX 402 or cell DTX 404. The non-uniform timing pattern 614 may be configured so that the on duration 412 in cell DRX or cell DTX maintains alignment even after multiple traffic cycles with uplink or downlink, traffic occasions 615 having non-integer periodicities. For example, if the base station 102 has configured the periodicity of data 616 such as XR traffic from or to the UE 104 with a 16.666 ms periodicity, the base station 102 may provide via configuration 612 a set of parameters for cell DRX or cell DTX to the UE 104 indicating a non-uniform timing pattern of [16, 16, 17] ms, [16, 17, 17] ms, or [16, 16, 18] ms for three respective DRX or DTX cycles, to maintain alignment with the XR traffic timing or traffic occasion 615 after a 50 ms interval. For instance, in the illustrated example 602, the base station 102 may configure the pattern [16, 16, 18] ms, in response to which configuration 612 the base station 102 may apply a recurring pattern of three DRX or DTX cycles or frames respectively having non-uniform periodicities of 16 ms, 16 ms, and 18 ms.

In some cases, these multiple, non-uniform DRX or DTX cycles may include, for example, short cycles between which the base station 102 and UE 104 may jointly switch in a semi-static manner. For instance, the configuration 612 may include, in addition to a periodicity and start offset for a long cycle 618 (using a parameter drx-LongCycleStartOffset or similar parameter name), multiple short cycles 620*a*, 620*b* and short cycle timers respectively corresponding to different periodicities in the non-uniform pattern (using the parameters drx-ShortCycle and drx-ShortCycleTimer, or similar parameters with other names). As an example, to configure the non-uniform timing pattern [16, 16, 18] ms in the configuration 612 so that the traffic occasions 615 of data 616 with 16.666 ms periodicity remains aligned with on duration 622 after 50 ms intervals, the base station may configure long cycle 618 with a 50 ms periodicity, first short cycle 620*a* with a 16 ms periodicity, a first short cycle timer value of 1 (corresponding to one 16 ms short DRX cycle), second short cycle 620*b* with an 18 ms periodicity, and a second short cycle timer value of 1 (corresponding to one 18 ms short DRX cycle). In response to this configuration 612, the UE 104 and base station 102 may switch between the long cycle 618, first short cycle 620*a*, and second short cycle 620*b* such as according to the example 602 illustrated in FIG. 6. In other examples, the base station may configure cell DRX or DTX parameters in configuration 612 to form other non-uniform timing patterns 614 in a similar manner, for example by adjusting the values of long and short cycle periodicities or timer values depending on the XR traffic periodicity.

In the second example 604, the base station 102 may configure the UE 104 with a non-integer timing pattern 624, such as a non-integer, uniform cycle periodicity associated with one or more cycles, for cell DRX 402 or cell DTX 404. In this example, the configuration 612 may include rational values, as opposed to solely integer values, for configurable periodicities of long cycles 420 or short cycles 422. Rational periodicity values may include, for example, 16.666 ms, 11.111 ms, 22.222 ms, 8.333 ms, 20.833 ms, and the like. For instance, in the example 604 of FIG. 6, the base station 102 may configure a DRX or DTX long cycle with a non-integer periodicity such as 16.666 ms (using a parameter drx-LongCycleStartOffset or similar parameter name) to maintain alignment with a configured 16.666 ms periodicity of data 616 such as XR traffic from or to the UE 104 in traffic occasions 615. Similarly in other examples, the base station 102 may configure a DRX or DTX short cycle within a long cycle with a non-integer periodicity such as 16.666 ms (using the parameters drx-ShortCycle and drx-ShortCycleTimer, or similar parameters with other names), or both long and short cycles with non-integer periodicities such as 49.998 ms and 16.666 ms respectively, to achieve the same result. The non-integer periodicities may be configurable in a same information element of the DRX or DTX configuration as integer periodicities for long or short cycles. Alternatively, the non-integer periodicities and integer periodicities may be configured in different information elements (using the parameters drx-LongCycleNon-Integer and drx-LongCycleStartOffset or similar parameter names).

Moreover, when determining a start time 626 for an on duration of a long or short cell DRX or DTX cycle with a configured non-integer periodicity, the UE 104 and base station 102 may apply a floor or other rounding function accounting for this configured non-integer periodicity. For example, the UE 104 and base station 102 may apply a floor operation to the following functions used in connection with determining the start time of a long or short cycle given in Equations (1) or (2) respectively:

$$\text{floor}([(\text{system frame number} \times 10) + \text{subframe number}] \\ \text{modulo}(\text{long cycle periodicity})) = \text{start offset} \quad (1)$$

$$\text{floor}([(\text{system frame number} \times 10) + \text{subframe number}] \\ \text{modulo}(\text{short cycle periodicity})) = \text{floor}((\text{start offset}) \text{modulo}(\text{short cycle periodicity})) \quad (2)$$

Here, the floor function may be applied in the aforementioned manner, or in a different manner in other examples, to align non-integer DRX or DTX periodicities with integer start offsets (configured using the parameter drx-LongCycle-StartOffset or similar parameter name). As a result, if the base station 102 determines for a long DRX or DTX cycle that Equation (1) is true for a particular system frame number, subframe number, long DRX or DTX cycle non-integer periodicity, and DRX or DTX start offset, the base station may start an on duration timer for the long cycle after a slot offset from the beginning of the subframe. Similarly, if the base station 102 determines for a short DRX or DTX cycle that Equation (2) is true for a particular system frame number, subframe number, short DRX or DTX cycle non-integer periodicity, and DRX or DTX start offset, the base station 102 may start an on duration timer for the short cycle after a slot offset from the beginning of the subframe. Thus, in the example of FIG. 6 where the base station 102 configures a DRX or DTX long or short cycle with a 16.666 ms periodicity to align with an XR traffic periodicity of 16.666 ms, the base station 102 may become active or switch to the on duration during the respective cycle beginning at the start time 626 calculated using the floor function in Equation (1) or (2) (or in some other equation for determining the start time of the long or short cycle).

In the third example 606, the base station 102 may again configure the UE 104 with a non-uniform timing pattern 614 for cell DRX 402 or cell DTX 404 similar to the first example 602. However, in this example the base station 102 configures the non-uniform timing pattern 614 via multiple, different start time values, rather than via a non-uniform periodicity itself. For instance, instead of configuring a non-uniform set of different integer periodicities for multiple cell DRX or DTX cycles having a single start time as in the first example 602, here the configuration 612 indicates a uniform integer periodicity for cell DRX or DTX cycles, but a single long or short cycle respectively has multiple start times 628, 630, 632 including start offsets, slot offsets, or a combination of start offsets and slot offsets. As these multiple start times 628, 630, 632 may thus correspond to different on durations, and thus different duty cycle periodicities, within the same long or short cycle, the timing of the on durations may reflect a non-uniform timing pattern 614. In the example of a long cycle, the multiple start times and associated periodicities may be configured in the same information element as the long cycle periodicity (using a parameter drx-LongCycleStartOffset or similar parameter name), or in different information elements (using a parameter drx-LongCycleStartOffset or similar parameter name for the first offset, and another parameter drx-StartOffset or similar parameter name for one or more additional offsets). Similarly, in the example of a short cycle, the multiple start times and associated periodicities may be configured in the same information element or in different information elements.

The UE 104 and base station 102 may switch between the different start time values within a given cell DRX or DTX cycle in a semi-static manner. For instance, in the example 606 of FIG. 6, to maintain alignment with a configured 16.666 ms periodicity of data 616 such as XR traffic from or to the UE 104 in traffic occasions 615, the base station 102 may configure a uniform integer periodicity for DRX or DTX long cycles or short cycles such as 50 ms in configuration 612 (using a parameter drx-LongCycleStartOffset or similar parameter name, or using a parameter drx-ShortCycle or similar parameter name), as well as multiple start times 628, 630, 632 such as 0 ms, 16 ms, and 33 ms corresponding to three different on durations within a same, 50 ms long or short cycle. In response to this configuration 612, the UE 104 and base station 102 may periodically switch between the different on durations within a given long or short cycle, such as illustrated in the example 606 of FIG. 6. In other examples, the base station 102 may configure cell DRX or DTX parameters in configuration 612 to form other non-uniform timing patterns 614 in a similar manner, for example by adjusting the values of the long and short cycle periodicity and multiple associated start offsets depending on the XR traffic periodicity.

In the fourth example 608, the base station 102 may configure the UE 104 with a non-uniform timing pattern 614 for cell DRX 402 or cell DTX 404 using a uniform integer periodicity, similar to the first example 602 and third example 606. However, in this example, the base station 102 configures the non-uniform timing pattern 614 via a single, start time 634 and an adjustment value 636, which adjustment value 636 the UE 104 and base station 102 periodically apply to adjust the start time 634 of an on duration of a long or short cycle after a configured quantity 637 of cycles N. For example, instead of configuring multiple start times that are applied within a single cell DRX or DTX cycle as in the third example 606, here the configuration 612 may indicate the single start time 634 including a start offset and slot offset, and the adjustment value 636 which is to be applied to the start offset and slot offset after a quantity N of cell DRX or DTX cycles, where N is an RRC-configured parameter (using a parameter drx-AdjustedStartOffset or another name). As this adjustment value 636 may change the periodicity of a DRX or DTX cycle with respect to an adjacent cycle, the timing of the different cycles may reflect a non-uniform timing pattern 614. Moreover, the quantity 637 N may be configured in the same information element as the long cycle or short cycle periodicity, or in a different information element.

Thus, in the example of FIG. 6, to maintain alignment with a configured 16.666 ms periodicity of data 616 such as XR traffic from or to the UE 104 in traffic occasions 615, the base station 102 may configure a DRX or DTX long cycle or short cycle in configuration 612 with a uniform periodicity of 16 ms (using a parameter drx-LongCycleStartOffset or similar parameter name, or using a parameter drx-ShortCycle or similar parameter name), a configured quantity 637 of cycles or value of N such as 3 cycles, a start time 634 such as 0 ms, and an adjustment value 636 for an Nth DRX or DTX long or short cycle such as 2 ms. In response to this configuration 612, the UE 104 and base station 102 may apply the uniform periodicity of 16 ms for respective long or short cycles until N=3 cycles have passed, after which the UE 104 and base station 102 may apply the adjustment value of 2 ms to the 0 ms start time of the next long or short cycle to effectively result in a changed periodicity of 18 ms and thus bring the cycles back into alignment with the XR traffic periodicity. In other examples, the base station 102 may configure cell DRX or DTX parameters in configuration 612 to form other non-uniform timing patterns 614 in a similar manner, for example by adjusting the values of the long and short cycle periodicity, the quantity 637 of cycles of N, the start time 634, and the adjustment value 636 depending on the XR traffic periodicity.

In the fifth example 610, the base station 102 may configure the UE 104 with a non-uniform timing pattern 614 for cell DRX 402 or cell DTX 404 using multiple cell DRX or DTX configurations, rather than a single configuration as in the previous examples 602, 606, 608. For instance, in this example, the base station 102 may configure the UE 104 with multiple sets of cell DRX or DTX parameters via different configurations, including configuration 612 and second configuration 638, to indicate multiple long cycle periodicities and start offsets (using two different values for the parameter drx-LongCycleStartOffset or similar parameter name respectively in the different configurations), multiple short cycle periodicities and cycle quantities, on duration timers, or the like. Whenever the on duration for a cell DRX or DTX cycle occurs in response to any of the multiple DRX or DTX configurations, the base station 102 becomes active, and the UE 104 may transmit data 616 to or receive data 616 from the base station 102.

The base station 102 may respectively configure the values of one or more cell DRX or DTX parameters in the configurations 612, 638 to result in associated long or short DRX/DTX cycles having a non-uniform timing pattern. For instance, in the example 610 of FIG. 6, the base station 102 may configure long cycles or short cycles in configuration 612 with a periodicity 640 such as 33 ms and a start time such as 0 ms, while configuring long or short cycles in second configuration 638 with a different periodicity 642 such as 34 ms and a different start time such as 16 ms. As a result, a non-uniform, integer cycle periodicity of 16 ms, 17 ms, 17 ms may effectively be configured using multiple configurations 612, 638 for groups of three DRX/DTX cycles, thereby maintaining alignment of cell DRX or DTX on durations with a configured 16.666 ms periodicity of data 616 such as XR traffic from or to the UE 104 in traffic occasions 615.

Figure 7:
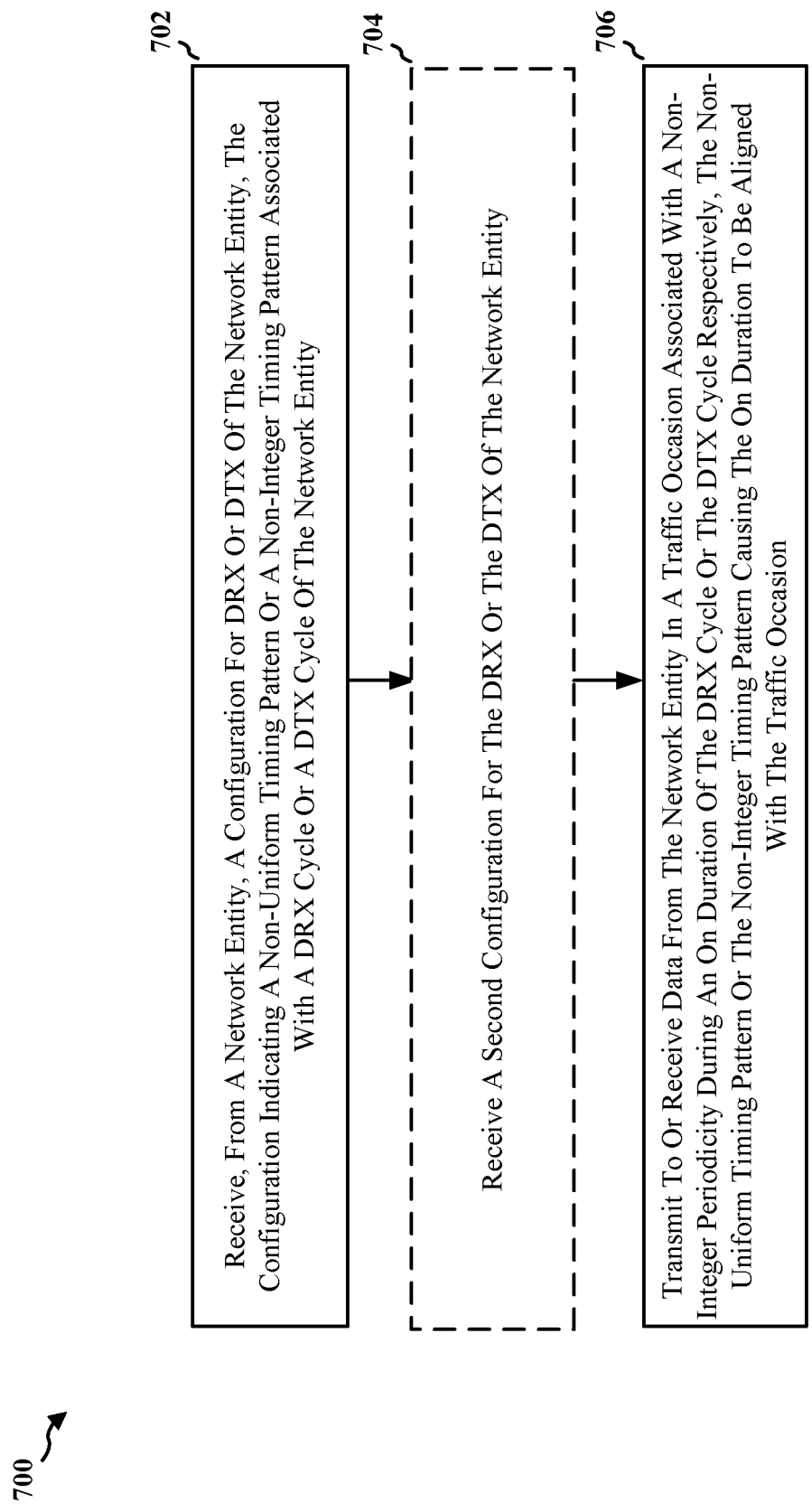
FIG. 7 is a flowchart of a method for wireless communication performable at a UE.

FIG. 7 is a flowchart 700 of an example method or process for wireless communication performable at a UE which communicates data such as XR content having a non-integer periodicity according to a configuration of non-uniform or non-integer cell DRX or DTX cycles. Optional aspects are illustrated in dashed lines. The method may be performed by a UE, such as the UE 104, 350, the apparatus 902, or its components as described herein.

In some examples, in block 702, the UE receives, from a network entity, a configuration for DRX or DTX of the network entity, the configuration indicating a non-uniform timing pattern or a non-integer timing pattern associated with a DRX cycle or a DTX cycle of the network entity. In some examples, the DRX cycle or the DTX cycle may be associated with the non-uniform timing pattern, while in other examples, the DRX cycle or the DTX cycle may be associated with the non-integer timing pattern. For example, block 702 may be performed by cell DRX or DTX configuration component 940. For instance, referring to the Figures, UE 104, 350 or cell DRX or DTX configuration component 940 may receive configuration 612 for cell DRX 402 or cell DTX 404 of base station 102/180. The configuration 612 may indicate non-uniform timing pattern 614 or non-integer timing pattern 624 for cell DRX cycles 416 or cell DTX cycles 418 which parameters are included in configuration 612. In some examples, the cell DRX cycles 416 or cell DTX cycles 418 may associated with non-uniform timing pattern 614 in configuration 612. For instance, these cycles may have their periodicities, offsets, or other parameters configured such as described with respect to first example 602, third example 606, fourth example 608, or fifth example 610. In some examples, the cell DRX cycles 416 or cell DTX cycles 418 may be associated with non-integer timing pattern 624 in configuration 612. For instance, these cycles may have their periodicities, offsets, or other parameters configured such as described with respect to second example 604.

In some examples, at block 704, the UE receives a second configuration for the DRX or the DTX of the network entity. For example, block 704 may also be performed by cell DRX or DTX configuration component 940. For instance, referring to the Figures, UE 104, 350 or cell DRX or DTX configuration component 940 may receive second configuration 638 for cell DRX 402 or cell DTX 404 of base station 102/180 in addition to configuration 612.

In some examples, in block 706, the UE transmits to or receives data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion. For example, block 706 may be performed by data component 942. For instance, referring to the Figures, UE 104, 350 or data component 942 may transmit to base station 102/180 in cell DRX 402, or receive from base station 102/180 in cell DTX 404, data 616 in traffic occasions 520, 615 occurring at non-integer periodicities 512. The data 616 may be respectively transmitted or received during on durations 412, 622 of cell DRX cycles 416 or cell DTX cycles 418 aligned with the traffic occasions 520, 615, which alignment, in turn, may occur as a result of the non-uniform timing pattern 614 or non-integer timing pattern 624 indicated in configuration 612 or the combination of configurations 612, 638. For example, the configuration of periodicities, offsets, or other parameters of cell DRX cycles 416 or cell DTX cycles 418 in configuration 612 according to any of the examples 602, 604, 606, 608, or in configurations 612, 638 according to example 610, may allow the on durations 412, 622 to overlap with the traffic occasions 520, 615 so that the base station may successfully receive data 616 in cell DRX 402 or successfully transmit data 616 in cell DTX 404.

In some examples, the configuration received at block 702 indicates a plurality of first cycle periodicities, and one of the first cycle periodicities is different than another one of the first cycle periodicities. For instance, referring to the Figures and the first example 602, configuration 612 may indicate different periodicities for respective cell DRX cycles 416 or cell DTX cycles 418, such as 16 ms for cycle 620a and 18 ms for cycle 620b. In some examples, the configuration further indicates a second cycle periodicity larger than each of the first cycle periodicities, the first cycle periodicities are associated with a DRX short cycle or a DTX short cycle, and the second cycle periodicity is associated with a DRX long cycle or a DTX long cycle. For instance, referring to the Figures and the first example 602, configuration 612 may indicate a long cycle periodicity of 50 ms for long cycle 420, 618, which is larger than the short cycle periodicities of 16 ms and 18 ms for short cycles 422, 620a and 620b respectively.

In some examples, the configuration received at block 702 indicates a uniform rational cycle periodicity, and a start time for the DRX cycle or the DTX cycle is a floored function of the uniform rational cycle periodicity. For instance, referring to the Figures and the second example 604, configuration 612 may indicate a non-integer periodicity of 16.666 ms, or other rational periodicity, to be uniformly applied to cell DRX cycles 416 or cell DTX cycles 418. In such case where a non-integer periodicity is configured, the UE 104 and base station 102 may determine the start time 626 of a respective cell DRX cycle 416 or cell DTX cycle 418 associated with this periodicity using a floor or other rounding operation in a formula which applies this non-integer periodicity, such as in Equation (1) or (2) above. In some examples, the uniform rational cycle periodicity is associated with a DRX long cycle, a DTX long cycle, a DRX short cycle, or a DTX short cycle. For instance, referring to the Figures, configuration 612 may indicate the non-integer periodicity of 16.666 ms, or other rational periodicity, to be uniformly applied to long cycles 420, short cycles 422, or a combination of long cycles 420 and short cycles 422.

In some examples, the configuration received at block 702 indicates a uniform cycle periodicity and a plurality of start times associated with the uniform cycle periodicity, and a periodicity corresponding to one of the start times is different than a periodicity corresponding to another one of the start times. For instance, referring to the Figures and the third example 606, configuration 612 may indicate an integer periodicity such as 50 ms which is to be uniformly applied to cell DRX cycles 416 or cell DTX cycles 418, and configuration 612 may further indicate multiple start times 628, 630, 632 such as 0 ms, 16 ms, and 33 ms corresponding to respective on durations 412 within a same cell DRX cycle 416 or a same cell DTX cycle 418. The start times 628, 630, 632 may be configured so that the on durations 412 within a given cell DRX cycle or cell DTX cycle occur at respectively different periodicities, such as 16 ms and 17 ms in the illustrated example 606 of FIG. 6. In some examples, the uniform cycle periodicity and the start times are associated with a DRX long cycle, a DTX long cycle, a DRX short cycle, or a DTX short cycle. For instance, referring to the Figures, configuration 612 may indicate the integer periodicity of 50 ms, or other integer periodicity, to be uniformly applied to long cycles 420, short cycles 422, or a combination of long cycles 420 and short cycles 422. Similarly, configuration 612 may indicate the start times 628, 630, 632 of 0 ms, 16 ms, and 33 ms, or other start times, may correspond to respective on durations 412 within a single long cycle or short cycle.

In some examples, the configuration received at block 702 indicates a uniform cycle periodicity, a start time associated with the uniform cycle periodicity, an adjustment value, and a quantity of cycles, and the start time is adjusted with the adjustment value after an occurrence of the quantity of cycles. For instance, referring to the Figures and the fourth example 608, configuration 612 may indicate an integer periodicity such as 16 ms which is to be uniformly applied to cell DRX cycles 416 or cell DTX cycles 418, the start time 634 such as 0 ms corresponding to respective on durations of these cell DRX cycles 416 or cell DTX cycles 418, adjustment value 636 such as 2 ms to be periodically added to the start time 634 for a respective on duration, and the quantity 637 of cell DRX or cell DTX cycles such as N=3 which are to occur before the UE 104 or base station 102 add the adjustment value 636 to the start time 634. In some examples, the uniform cycle periodicity, the start time, and the adjustment value are associated with a DRX long cycle, a DTX long cycle, a DRX short cycle, or a DTX short cycle. For instance, referring to the Figures, configuration 612 may indicate the integer periodicity of 16 ms, or other integer periodicity, to be uniformly applied to long cycles 420, short cycles 422, or a combination of long cycles 420 and short cycles 422. Similarly, configuration 612 may indicate the start time 634 of the long cycles 420 or short cycles 422, the adjustment value 636 to be applied to certain long cycles 420 or short cycles 422, and the quantity 637 of long cycles 420 or short cycles 422 which are to occur before the UE 104 and base station 102 apply the adjustment value 636.

In some examples, the configuration received at block 702 indicates a first uniform cycle periodicity and the second configuration received at block 704 indicates a second uniform cycle periodicity, and the first uniform cycle periodicity is different than the second uniform cycle periodicity. For instance, referring to the Figures and the fifth example 610, configuration 612 may indicate an integer periodicity such as 33 ms which is to be uniformly applied to certain cell DRX cycles 416 or cell DTX cycles 418 such as the odd cycles in example 610 of FIG. 6, while second configuration 638 may indicate a different integer periodicity such as 34 ms which is to be uniformly applied to other cell DRX cycles 416 or cell DTX cycles 418 such as the even cycles in example 610 of FIG. 6.

Figure 8:
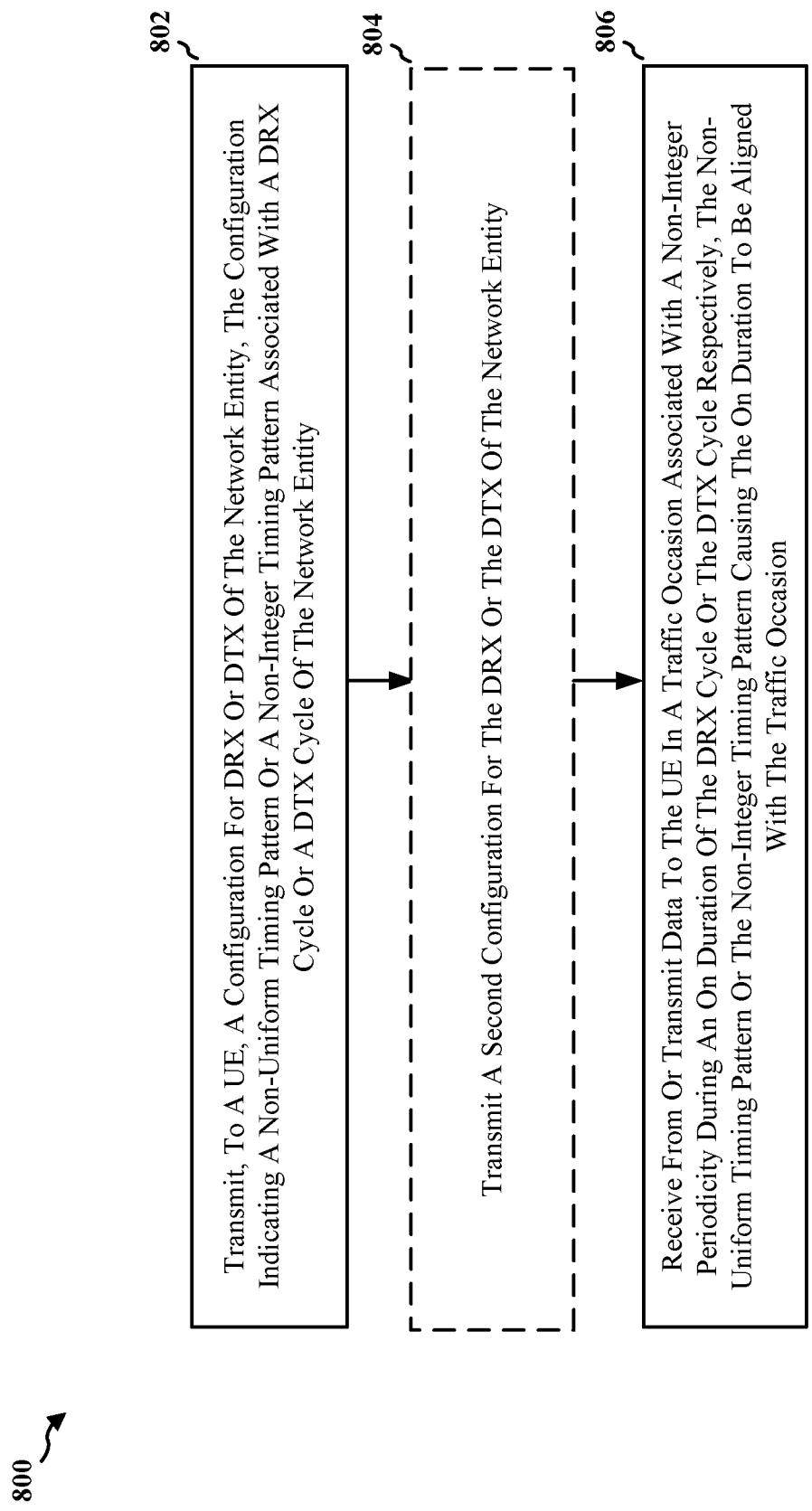
FIG. 8 is a flowchart of a method for wireless communication performable at a network entity such as a base station.

FIG. 8 is a flowchart 800 of an example method or process for wireless communication performable at a network entity which configures non-uniform or non-integer cell DRX or DTX cycles to communicate data such as XR content having a non-integer periodicity. Optional aspects are illustrated in dashed lines. The method may be performed by a network entity, such as the base station 102/180, 181, 310, the apparatus 1002, or its components as described herein.

In some examples, in block 802, the network entity transmits, to a UE, a configuration for DRX or DTX of the network entity, the configuration indicating a non-uniform timing pattern or a non-integer timing pattern associated with a DRX cycle or a DTX cycle of the network entity. In some examples, the DRX cycle or the DTX cycle may be associated with the non-uniform timing pattern, while in other examples, the DRX cycle or the DTX cycle may be associated with the non-integer timing pattern. For example, block 802 may be performed by cell DRX or DTX configuration component 1040. For instance, referring to the Figures, base station 102/180, 181, 310 or cell DRX or DTX configuration component 1040 may transmit, to UE 104, configuration 612 for cell DRX 402 or cell DTX 404 of the base station. The configuration 612 may indicate non-uniform timing pattern 614 or non-integer timing pattern 624 for cell DRX cycles 416 or cell DTX cycles 418 which parameters are included in configuration 612. In some examples, the cell DRX cycles 416 or cell DTX cycles 418 may associated with non-uniform timing pattern 614 in configuration 612. For instance, these cycles may have their periodicities, offsets, or other parameters configured such as described with respect to first example 602, third example 606, fourth example 608, or fifth example 610. In some examples, the cell DRX cycles 416 or cell DTX cycles 418 may be associated with non-integer timing pattern 624 in configuration 612. For instance, these cycles may have their periodicities, offsets, or other parameters configured such as described with respect to second example 604.

In some examples, at block 804, the network entity transmits a second configuration for the DRX or the DTX of the network entity. For example, block 804 may also be performed by cell DRX or DTX configuration component 1040. For instance, referring to the Figures, base station 102/180, 181, 310 or cell DRX or DTX configuration component 1040 may transmit second configuration 638 for cell DRX 402 or cell DTX 404 of base station 102/180 in addition to configuration 612.

In some examples, in block 806, the network entity receives from or transmits data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion. For example, block 806 may be performed by data component 1042. For instance, referring to the Figures, base station 102/180, 181, 310 or data component 1042 may receive from UE 104 in cell DRX 402, or transmit to UE 104 in cell DTX 404, data 616 in traffic occasions 520, 615 occurring at non-integer periodicities 512. The data 616 may be respectively transmitted or received during on durations 412, 622 of cell DRX cycles 416 or cell DTX cycles 418 aligned with the traffic occasions 520, 615, which alignment, in turn, may occur as a result of the non-uniform timing pattern 614 or non-integer timing pattern 624 indicated in configuration 612 or the combination of configurations 612, 638. For example, the configuration of periodicities, offsets, or other parameters of cell DRX cycles 416 or cell DTX cycles 418 in configuration 612 according to any of the examples 602, 604, 606, 608, or in configurations 612, 638 according to example 610, may allow the on durations 412, 622 to overlap with the traffic occasions 520, 615 so that the base station may successfully receive data 616 in cell DRX 402 or successfully transmit data 616 in cell DTX 404.

In some examples, the configuration transmitted at block 802 indicates a plurality of first cycle periodicities, and one of the first cycle periodicities is different than another one of the first cycle periodicities. For instance, referring to the Figures and the first example 602, configuration 612 may indicate different periodicities for respective cell DRX cycles 416 or cell DTX cycles 418, such as 16 ms for cycle 620a and 18 ms for cycle 620b. In some examples, the configuration further indicates a second cycle periodicity larger than each of the first cycle periodicities, the first cycle periodicities are associated with a DRX short cycle or a DTX short cycle, and the second cycle periodicity is associated with a DRX long cycle or a DTX long cycle. For instance, referring to the Figures and the first example 602, configuration 612 may indicate a long cycle periodicity of 50 ms for long cycle 420, 618, which is larger than the short cycle periodicities of 16 ms and 18 ms for short cycles 422, 620a and 620b respectively.

In some examples, the configuration transmitted at block 802 indicates a uniform rational cycle periodicity, and a start time for the DRX cycle or the DTX cycle is a floored function of the uniform rational cycle periodicity. For instance, referring to the Figures and the second example 604, configuration 612 may indicate a non-integer periodicity of 16.666 ms, or other rational periodicity, to be uniformly applied to cell DRX cycles 416 or cell DTX cycles 418. In such case where a non-integer periodicity is configured, the UE 104 and base station 102 may determine the start time 626 of a respective cell DRX cycle 416 or cell DTX cycle 418 associated with this periodicity using a floor or other rounding operation in a formula which applies this non-integer periodicity, such as in Equation (1) or (2) above. In some examples, the uniform rational cycle periodicity is associated with a DRX long cycle, a DTX long cycle, a DRX short cycle, or a DTX short cycle. For instance, referring to the Figures, configuration 612 may indicate the non-integer periodicity of 16.666 ms, or other rational periodicity, to be uniformly applied to long cycles 420, short cycles 422, or a combination of long cycles 420 and short cycles 422.

In some examples, the configuration transmitted at block 802 indicates a uniform cycle periodicity and a plurality of start times associated with the uniform cycle periodicity, and a periodicity corresponding to one of the start times is different than a periodicity corresponding to another one of the start times. For instance, referring to the Figures and the third example 606, configuration 612 may indicate an integer periodicity such as 50 ms which is to be uniformly applied to cell DRX cycles 416 or cell DTX cycles 418, and configuration 612 may further indicate multiple start times 628, 630, 632 such as 0 ms, 16 ms, and 33 ms corresponding to respective on durations 412 within a same cell DRX cycle 416 or a same cell DTX cycle 418. The start times 628, 630, 632 may be configured so that the on durations 412 within a given cell DRX cycle or cell DTX cycle occur at respectively different periodicities, such as 16 ms and 17 ms in the illustrated example 606 of FIG. 6. In some examples, the uniform cycle periodicity and the start times are associated with a DRX long cycle, a DTX long cycle, a DRX short cycle, or a DTX short cycle. For instance, referring to the Figures, configuration 612 may indicate the integer periodicity of 50 ms, or other integer periodicity, to be uniformly applied to long cycles 420, short cycles 422, or a combination of long cycles 420 and short cycles 422. Similarly, configuration 612 may indicate the start times 628, 630, 632 of 0 ms, 16 ms, and 33 ms, or other start times, may correspond to respective on durations 412 within a single long cycle or short cycle.

In some examples, the configuration transmitted at block 802 indicates a uniform cycle periodicity, a start time associated with the uniform cycle periodicity, an adjustment value, and a quantity of cycles, and the start time is adjusted with the adjustment value after an occurrence of the quantity of cycles. For instance, referring to the Figures and the fourth example 608, configuration 612 may indicate an integer periodicity such as 16 ms which is to be uniformly applied to cell DRX cycles 416 or cell DTX cycles 418, the start time 634 such as 0 ms corresponding to respective on durations of these cell DRX cycles 416 or cell DTX cycles 418, adjustment value 636 such as 2 ms to be periodically added to the start time 634 for a respective on duration, and the quantity 637 of cell DRX or cell DTX cycles such as N=3 which are to occur before the UE 104 or base station 102 add the adjustment value 636 to the start time 634. In some examples, the uniform cycle periodicity, the start time, and the adjustment value are associated with a DRX long cycle, a DTX long cycle, a DRX short cycle, or a DTX short cycle. For instance, referring to the Figures, configuration 612 may indicate the integer periodicity of 16 ms, or other integer periodicity, to be uniformly applied to long cycles 420, short cycles 422, or a combination of long cycles 420 and short cycles 422. Similarly, configuration 612 may indicate the start time 634 of the long cycles 420 or short cycles 422, the adjustment value 636 to be applied to certain long cycles 420 or short cycles 422, and the quantity 637 of long cycles 420 or short cycles 422 which are to occur before the UE 104 and base station 102 apply the adjustment value 636.

In some examples, the configuration transmitted at block 802 indicates a first uniform cycle periodicity and the second configuration transmitted at block 804 indicates a second uniform cycle periodicity, and the first uniform cycle periodicity is different than the second uniform cycle periodicity. For instance, referring to the Figures and the fifth example 610, configuration 612 may indicate an integer periodicity such as 33 ms which is to be uniformly applied to certain cell DRX cycles 416 or cell DTX cycles 418 such as the odd cycles in example 610 of FIG. 6, while second configuration 638 may indicate a different integer periodicity such as 34 ms which is to be uniformly applied to other cell DRX cycles 416 or cell DTX cycles 418 such as the even cycles in example 610 of FIG. 6.

Figure 9:
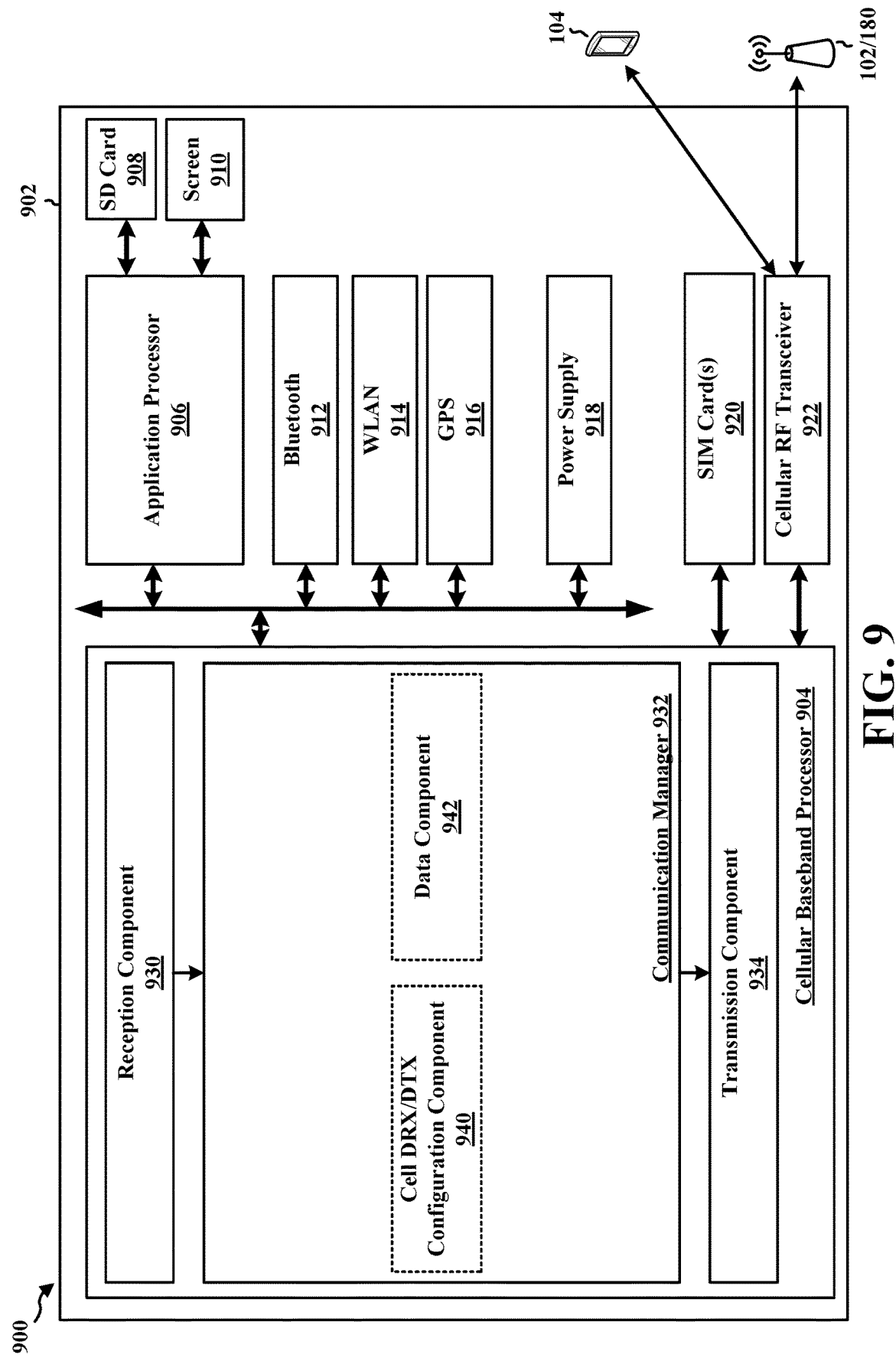
FIG. 9 is a diagram illustrating an example of a hardware implementation for an apparatus that is a UE.

FIG. 9 is a diagram 900 illustrating an example of a hardware implementation for an apparatus 902 that communicates data such as XR content having a non-integer periodicity according to a configuration of non-uniform or non-integer cell DRX or DTX cycles according to some aspects of the present disclosure. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 104, 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., sec UE 350 of FIG. 3) and include the aforediscussed additional modules of the apparatus 902.

The communication manager 932 includes a cell DRX or DTX configuration component 940 that is configured to receive via reception component 930, from a network entity, a configuration for DRX or DTX of the network entity, the configuration indicating a non-uniform timing pattern or a non-integer timing pattern associated with a DRX cycle or a DTX cycle of the network entity, such as described in connection with block 702 of FIG. 7. The cell DRX or DTX configuration component 940 may also be configured to receive via reception component 930 a second configuration for the DRX or the DTX of the network entity, such as described in connection with block 704 of FIG. 7. The reception component 930 may be configured to receive, demodulate and decode the configuration and the second configuration from the network entity and provide the demodulated and decoded configurations to the cell DRX or DTX configuration component 940, where the reception, demodulation and decoding may be performed such as described in connection with FIG. 3. The communication manager 932 further includes a data component 942 that is configured to transmit via transmission component 934 or receive via reception component 930 data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion, such as described in connection with block 706 of FIG. 7. The transmission component 934 may be configured to obtain the data from the data component 942 and encode, modulate, and transmit the data to the network entity, where the coding, modulation, and transmission may be performed such as described in connection with FIG. 3. Similarly, the reception component 930 may be configured to receive, demodulate and decode the data from the network entity and provide the demodulated and decoded configurations to the data component 942.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a network entity, a configuration for DRX or DTX of the network entity, the configuration indicating a non-uniform timing pattern or a non-integer timing pattern associated with a DRX cycle or a DTX cycle of the network entity; and means for transmitting to or receiving data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion. In one configuration, the means for receiving is further configured to receive a second configuration for the DRX or the DTX of the network entity.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
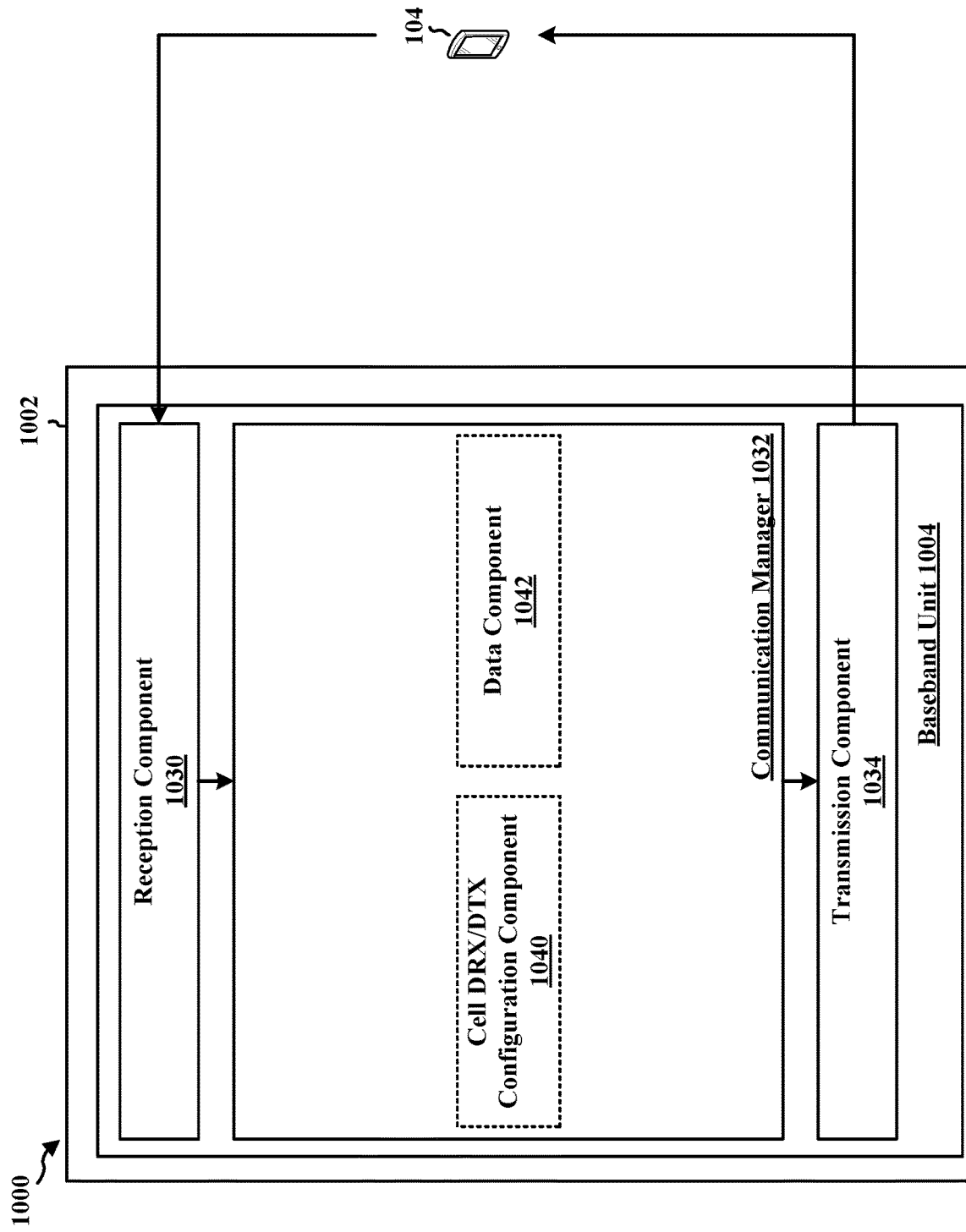
FIG. 10 is a diagram illustrating an example of a hardware implementation for an apparatus that is a BS.

FIG. 10 is a diagram 1000 illustrating an example of a hardware implementation for an apparatus 1002 that configures non-uniform or non-integer cell DRX or DTX cycles to communicate data such as XR content having a non-integer periodicity according to some aspects of the present disclosure. The apparatus 1002 is a base station (BS) and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 102/180, 181, 310 and may include the memory 376 and/or at least one of the TX processor 316, the RX processor 370, and the controller/processor 375.

The communication manager 1032 includes a cell DRX or DTX configuration component 1040 that is configured to transmit via transmission component 1034, to a UE, a configuration for discontinuous reception (DRX) or discontinuous transmission (DTX) of the network entity, the configuration indicating a non-uniform timing pattern or a non-integer timing pattern associated with a DRX cycle or a DTX cycle of the network entity, such as described with respect to block 802 of FIG. 8. The cell DRX or DTX configuration component 1040 may also be configured to transmit via transmission component 1034 a second configuration for the DRX or the DTX of the network entity, such as described in connection with block 804 of FIG. 8. The transmission component 934 may be configured to obtain the configuration and the second configuration from the cell DRX or DTX configuration component 1040 and encode, modulate, and transmit the configuration and second configuration to the UE, where the coding, modulation, and transmission may be performed such as described in connection with FIG. 3. The communication manager 1032 further includes a data component 1042 that is configured to receive via reception component 1030 or transmit via transmission component 1034 data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion, such as described with respect to block 806 of FIG. 8. The reception component 1030 may be configured to receive, demodulate and decode the data from the UE and provide the demodulated and decoded data to the data component 1042, where the reception, demodulation and decoding may be performed such as described in connection with FIG. 3. Similarly, the transmission component 1034 may be configured to obtain the data from the data component 1042 and encode, modulate, and transmit the data to the UE.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, a configuration for DRX or DTX of the network entity, the configuration indicating a non-uniform timing pattern or a non-integer timing pattern associated with a DRX cycle or a DTX cycle of the network entity; and means for receiving from or transmitting data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion. The means for transmitting is further configured to transmit a second configuration for the DRX or the DTX of the network entity.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. A method for wireless communication performable at a UE, comprising: receiving, from a network entity, a configuration for DRX or DTX of the network entity, the configuration indicating a non-uniform timing pattern or a non-integer timing pattern associated with a DRX cycle or a DTX cycle of the network entity; and transmitting to or receiving data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion.

Clause 2. The method of clause 1, wherein the DRX cycle or the DTX cycle is associated with the non-uniform timing pattern.

Clause 3. The method of clause 2, wherein the configuration indicates a plurality of first cycle periodicities, and one of the first cycle periodicities is different than another one of the first cycle periodicities.

Clause 4. The method of clause 3, wherein the configuration further indicates a second cycle periodicity larger than each of the first cycle periodicities, the first cycle periodicities are associated with a DRX short cycle or a DTX short cycle, and the second cycle periodicity is associated with a DRX long cycle or a DTX long cycle.

Clause 5. The method of any of clauses 2 to 4, wherein the configuration indicates a uniform cycle periodicity and a plurality of start times associated with the uniform cycle periodicity, and a periodicity corresponding to one of the start times is different than a periodicity corresponding to another one of the start times.

Clause 6. The method of clause 5, wherein the uniform cycle periodicity and the start times are associated with a DRX long cycle, a DTX long cycle, a DRX short cycle, or a DTX short cycle.

Clause 7. The method of any of clauses 2 to 6, wherein the configuration indicates a uniform cycle periodicity, a start time associated with the uniform cycle periodicity, an adjustment value, and a quantity of cycles, and the start time is adjusted with the adjustment value after an occurrence of the quantity of cycles.

Clause 8. The method of clause 7, wherein the uniform cycle periodicity, the start time, and the adjustment value are associated with a DRX long cycle, a DTX long cycle, a DRX short cycle, or a DTX short cycle.

Clause 9. The method of any of clauses 2 to 8, further comprising: receiving a second configuration for the DRX or the DTX of the network entity, wherein the configuration indicates a first uniform cycle periodicity and the second configuration indicates a second uniform cycle periodicity, and the first uniform cycle periodicity is different than the second uniform cycle periodicity.

Clause 10. The method of any of clauses 1 to 9, wherein the DRX cycle or the DTX cycle is associated with the non-integer timing pattern.

Clause 11. The method of clause 10, wherein the configuration indicates a uniform rational cycle periodicity, and a start time for the DRX cycle or the DTX cycle is a floored function of the uniform rational cycle periodicity.

Clause 12. The method of clause 11, wherein the uniform rational cycle periodicity is associated with a DRX long cycle, a DTX long cycle, a DRX short cycle, or a DTX short cycle.

Clause 13. An apparatus for wireless communication, comprising: a memory; and a processor communicatively coupled with the memory, the processor operable to cause the apparatus to: receive, from a network entity, a configuration for discontinuous reception (DRX) or discontinuous transmission (DTX) of the network entity, the configuration indicating a non-uniform timing pattern or a non-integer timing pattern associated with a DRX cycle or a DTX cycle of the network entity; and transmit to or receive data from the network entity in a traffic occasion associated with a non-integer periodicity during an on duration of the DRX cycle or the DTX cycle respectively, the non-uniform timing pattern or the non-integer timing pattern causing the on duration to be aligned with the traffic occasion.

Clause 14. The apparatus of clause 13, wherein the DRX cycle or the DTX cycle is associated with the non-uniform timing pattern.

Clause 15. The apparatus of clause 14, wherein the configuration indicates a plurality of first cycle periodicities, and one of the first cycle periodicities is different than another one of the first cycle periodicities.

Clause 16. The apparatus of clause 14 or clause 15, wherein the configuration indicates a uniform cycle periodicity and a plurality of start times associated with the uniform cycle periodicity, and a periodicity corresponding to one of the start times is different than a periodicity corresponding to another one of the start times.

Clause 17. The apparatus of any of clauses 14 to 16, wherein the configuration indicates a uniform cycle periodicity, a start time associated with the uniform cycle periodicity, an adjustment value, and a quantity of cycles, and the start time is adjusted with the adjustment value after an occurrence of the quantity of cycles.

Clause 18. The apparatus of any of clauses 14 to 17, wherein the processor is operable to further cause the apparatus to: receive a second configuration for the DRX or the DTX of the network entity, wherein the configuration indicates a first uniform cycle periodicity and the second configuration indicates a second uniform cycle periodicity, and the first uniform cycle periodicity is different than the second uniform cycle periodicity.

Clause 19. The apparatus of any of clauses 13 to 18, wherein the DRX cycle or the DTX cycle is associated with the non-integer timing pattern.

Clause 20. The apparatus of clause 19, wherein the configuration indicates a uniform rational cycle periodicity, and a start time for the DRX cycle or the DTX cycle is a floored function of the uniform rational cycle periodicity.

Clause 21. A method for wireless communication performable at a network entity, comprising: transmitting, to a user equipment (UE), a configuration for discontinuous reception (DRX) or discontinuous transmission (DTX) of the network entity, the configuration indicating a non-uniform timing pattern or a non-integer timing pattern associated with a DRX cycle or a DTX cycle of the network entity; and receiving from or transmitting data to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion.

Clause 22. The method of clause 21, wherein the DRX cycle or the DTX cycle is associated with the non-uniform timing pattern.

Clause 23. The method of clause 22, wherein the configuration indicates a plurality of first cycle periodicities, and one of the first cycle periodicities is different than another one of the first cycle periodicities.

Clause 24. The method of clause 22 or clause 23, wherein the configuration indicates a uniform cycle periodicity and a plurality of start times associated with the uniform cycle periodicity, and a periodicity corresponding to one of the start times is different than a periodicity corresponding to another one of the start times.

Clause 25. The method of any of clauses 22 to 24, wherein the configuration indicates a uniform cycle periodicity, a start time associated with the uniform cycle periodicity, an adjustment value, and a quantity of cycles, and the start time is adjusted with the adjustment value after an occurrence of the quantity of cycles.

Clause 26. The method of any of clauses 22 to 25, further comprising: transmitting a second configuration for the DRX or the DTX of the network entity, wherein the configuration indicates a first uniform cycle periodicity and the second configuration indicates a second uniform cycle periodicity, and the first uniform cycle periodicity is different than the second uniform cycle periodicity.

Clause 27. The method of any of clauses 21 to 26, wherein the DRX cycle or the DTX cycle is associated with the non-integer timing pattern.

Clause 28. The method of clause 27, wherein the configuration indicates a uniform rational cycle periodicity, and a start time for the DRX cycle or the DTX cycle is a floored function of the uniform rational cycle periodicity.

Clause 29. An apparatus for wireless communication, comprising: a memory; and a processor communicatively coupled with the memory, the processor operable to cause the apparatus to: transmit, to a user equipment (UE), a configuration for discontinuous reception (DRX) or discontinuous transmission (DTX) of the apparatus, the configuration indicating a non-uniform timing pattern or a non-integer timing pattern associated with a DRX cycle or a DTX cycle of the apparatus, the apparatus being a network entity; and receive from or transmit a signal to the UE in a traffic occasion associated with a non-integer periodicity during an on duration of the DRX cycle or the DTX cycle respectively, the non-uniform timing pattern or the non-integer timing pattern causing the on duration to be aligned with the traffic occasion.

Clause 30. The apparatus of clause 29, wherein the DRX cycle is a DRX long cycle or a DRX short cycle, and the DTX cycle is a DTX long cycle or a DTX short cycle.

What is claimed is:

1. A method for wireless communication performable at a user equipment (UE), comprising:
   receiving, from a network entity, a configuration for discontinuous reception (DRX) or discontinuous transmission (DTX) of the network entity, the configuration indicating a non-uniform timing pattern that is associated with a DRX cycle or a DTX cycle of the network entity, the configuration further indicating a plurality of first cycle periodicities, with one of the first cycle periodicities being different than another one of the first cycle periodicities; and
   transmitting to or receiving data from the network entity in a traffic occasion associated with a non-integer periodicity during an on duration of the DRX cycle or the DTX cycle respectively, the non-uniform timing pattern causing the on duration to be aligned with the traffic occasion.

2. The method of claim 1, wherein the configuration further indicates a second cycle periodicity larger than each of the first cycle periodicities, the first cycle periodicities are associated with a DRX short cycle or a DTX short cycle, and the second cycle periodicity is associated with a DRX long cycle or a DTX long cycle.

3. The method of claim 1, wherein the configuration further indicates a uniform cycle periodicity and a plurality of start times associated with the uniform cycle periodicity, and a periodicity corresponding to one of the start times is different than a periodicity corresponding to another one of the start times.

4. The method of claim 3, wherein the uniform cycle periodicity and the start times are associated with a DRX long cycle, a DTX long cycle, a DRX short cycle, or a DTX short cycle.

5. The method of claim 1, wherein the configuration further indicates a uniform cycle periodicity, a start time associated with the uniform cycle periodicity, an adjustment value, and a quantity of cycles, and the start time is adjusted with the adjustment value after an occurrence of the quantity of cycles.

6. The method of claim 5, wherein the uniform cycle periodicity, the start time, and the adjustment value are associated with a DRX long cycle, a DTX long cycle, a DRX short cycle, or a DTX short cycle.

7. The method of claim 1, further comprising:
   receiving a second configuration for the DRX or the DTX of the network entity,
   wherein the configuration indicates a first uniform cycle periodicity and the second configuration indicates a second uniform cycle periodicity, and the first uniform cycle periodicity is different than the second uniform cycle periodicity.

8. An apparatus for wireless communication, comprising:
   a memory; and a processor communicatively coupled with the memory, the processor operable to cause the apparatus to:

receive, from a network entity, a configuration for discontinuous reception (DRX) or discontinuous transmission (DTX) of the network entity, the configuration indicating a non-uniform timing pattern that is associated with a DRX cycle or a DTX cycle of the network entity, the configuration further indicating a plurality of first cycle periodicities, with one of the first cycle periodicities being different than another one of the first cycle periodicities; and transmit to or receive data from the network entity in a traffic occasion associated with a non-integer periodicity during an on duration of the DRX cycle or the DTX cycle respectively, the non-uniform timing pattern causing the on duration to be aligned with the traffic occasion.

9. The apparatus of claim 8, wherein the configuration further indicates a uniform cycle periodicity and a plurality of start times associated with the uniform cycle periodicity, and a periodicity corresponding to one of the start times is different than a periodicity corresponding to another one of the start times.

10. The apparatus of claim 8, wherein the configuration further indicates a uniform cycle periodicity, a start time associated with the uniform cycle periodicity, an adjustment value, and a quantity of cycles, and the start time is adjusted with the adjustment value after an occurrence of the quantity of cycles.

11. The apparatus of claim 8, wherein the processor is operable to further cause the apparatus to:

receive a second configuration for the DRX or the DTX of the network entity, wherein the configuration indicates a first uniform cycle periodicity and the second configuration indicates a second uniform cycle periodicity, and the first uniform cycle periodicity is different than the second uniform cycle periodicity.

12. A method for wireless communication performable at a network entity, comprising:

transmitting, to a user equipment (UE), a configuration for discontinuous reception (DRX) or discontinuous transmission (DTX) of the network entity, the configuration indicating a non-uniform timing pattern that is associated with a DRX cycle or a DTX cycle of the network entity, the configuration further indicating a plurality of first cycle periodicities, with one of the first cycle periodicities being different than another one of the first cycle periodicities; and receiving from or transmitting data to the UE in a traffic occasion associated with a non-integer periodicity during an on duration of the DRX cycle or the DTX cycle respectively, the non-uniform timing pattern causing the on duration to be aligned with the traffic occasion.

13. The method of claim 12, wherein the configuration further indicates a uniform cycle periodicity and a plurality of start times associated with the uniform cycle periodicity, and a periodicity corresponding to one of the start times is different than a periodicity corresponding to another one of the start times.

14. The method of claim 12, wherein the configuration further indicates a uniform cycle periodicity, a start time associated with the uniform cycle periodicity, an adjustment value, and a quantity of cycles, and the start time is adjusted with the adjustment value after an occurrence of the quantity of cycles.

15. The method of claim 12, further comprising:

transmitting a second configuration for the DRX or the DTX of the network entity, wherein the configuration indicates a first uniform cycle periodicity and the second configuration indicates a second uniform cycle periodicity, and the first uniform cycle periodicity is different than the second uniform cycle periodicity.

16. An apparatus for wireless communication, comprising:

a memory; and a processor communicatively coupled with the memory, the processor operable to cause the apparatus to:

transmit, to a user equipment (UE), a configuration for discontinuous reception (DRX) or discontinuous transmission (DTX) of the apparatus, the configuration indicating a non-uniform timing pattern that is associated with a DRX cycle or a DTX cycle of the apparatus, the apparatus being a network entity, the configuration further indicating a plurality of first cycle periodicities, with one of the first cycle periodicities being different than another one of the first cycle periodicities; and receive from or transmit a signal to the UE in a traffic occasion associated with a non-integer periodicity during an on duration of the DRX cycle or the DTX cycle respectively, the non-uniform timing pattern causing the on duration to be aligned with the traffic occasion.

17. The apparatus of claim 16, wherein the DRX cycle is a DRX long cycle or a DRX short cycle, and the DTX cycle is a DTX long cycle or a DTX short cycle.

* * * * *